(12) United States Patent
Chhabra et al.

(10) Patent No.: US 12,143,501 B2
(45) Date of Patent: Nov. 12, 2024

(54) ISA SUPPORT FOR PROGRAMMING HARDWARE OVER UNTRUSTED LINKS

(71) Applicant: Intel Corporation, Santa Clara, CA (US)

(72) Inventors: Siddhartha Chhabra, Portland, OR (US); Manjula Peddireddy, Santa Clara, CA (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 17/134,352

(22) Filed: Dec. 26, 2020

(65) Prior Publication Data

US 2022/0209959 A1    Jun. 30, 2022

(51) Int. Cl.
| | |
|---|---|
| H04L 9/08 | (2006.01) |
| G06F 12/14 | (2006.01) |
| G06F 13/16 | (2006.01) |
| G06F 21/64 | (2013.01) |
| G06F 21/78 | (2013.01) |
| H04L 9/32 | (2006.01) |
| H04L 9/40 | (2022.01) |
| G06F 21/72 | (2013.01) |
| G06F 21/79 | (2013.01) |

(52) U.S. Cl.
CPC ........ *H04L 9/3242* (2013.01); *G06F 12/1408* (2013.01); *G06F 13/1668* (2013.01); *G06F 21/64* (2013.01); *G06F 21/78* (2013.01); *H04L 9/0819* (2013.01); *H04L 9/0894* (2013.01); *H04L 63/0428* (2013.01); *H04L 63/123* (2013.01); *G06F 21/72* (2013.01); *G06F 21/79* (2013.01)

(58) Field of Classification Search
CPC ... H04L 9/3242; H04L 9/0819; H04L 9/0894; H04L 63/0428; H04L 63/123; H04L 9/3221; G06F 12/1408; G06F 13/1668; G06F 21/64; G06F 21/78; G06F 21/72; G06F 21/79; G06F 21/71
See application file for complete search history.

(56) References Cited

U.S. PATENT DOCUMENTS

| | | | | |
|---|---|---|---|---|
| 2008/0240434 | A1* | 10/2008 | Kitamura | G06F 21/80 380/255 |
| 2009/0172416 | A1* | 7/2009 | Bosch | G06F 12/1408 713/193 |

(Continued)

OTHER PUBLICATIONS

European Search Report and Search Opinion, EP App. No. 21198888.6, Mar. 1, 2022, 11 pages.

*Primary Examiner* — Shaqueal D Wade-Wright
(74) *Attorney, Agent, or Firm* — NICHOLSON DE VOS WEBSTER & ELLIOTT LLP

(57) ABSTRACT

In embodiments detailed herein describe an encryption architecture with fast zero support (e.g., FZ-MKTME) to allow memory encryption and integrity architecture to work efficiently with 3DXP or other far memory memories. In particular, an encryption engine for the purpose of fast zeroing in the far memory controller is detailed along with mechanisms for consistent key programming of this engine. For example, an instruction is detailed which allows software to send keys protected even when the controller is located outside of a system on a chip (SoC), etc.

20 Claims, 20 Drawing Sheets

(56) References Cited

U.S. PATENT DOCUMENTS

| | | | |
|---|---|---|---|
| 2016/0062921 A1* | 3/2016 | Kim | H04L 9/3242 |
| | | | 713/193 |
| 2016/0085692 A1* | 3/2016 | Kwok | G06F 21/79 |
| | | | 713/193 |
| 2016/0283750 A1* | 9/2016 | Durham | G06F 12/1408 |
| 2017/0090815 A1* | 3/2017 | Kelner | G06F 3/0647 |
| 2017/0285976 A1* | 10/2017 | Durham | G06F 21/64 |
| 2019/0042476 A1 | 2/2019 | Chhabra et al. | |

* cited by examiner

```
┌─────────────────────────────────────────────────────────────────────┐
│ FETCH AN INSTRUCTION HAVING FIELDS FOR AN OPCODE, ONE OR MORE FIELDS│
│ TO IDENTIFY A FIRST SOURCE OPERAND, THE FIRST SOURCE OPERAND TO     │
│ STORE AN ADDRESS OF FIRST DATA STRUCTURE, ONE OR MORE FIELDS TO     │
│ IDENTIFY A FIRST DESTINATION OPERAND TO STORE AN ADDRESS TO STORE   │
│ A RESULT OF EXECUTION OF THE INSTRUCTION, ONE OR MORE FIELDS TO     │
│ IDENTIFY A SECOND DESTINATION OPERAND TO STORE AN OPERATIONAL       │
│ STATUS OF THE INSTRUCTION, WHEREIN THE OPCODE IS T INDICATE         │
│ EXECUTION CIRCUITRY IS TO STORE A FIRST AND A SECOND KEY            │
│ INFORMATION FROM THE FIRST DATA STRUCTURE INTO A SECOND DATA        │
│ STRUCTURE, GENERATE A MAC OVER THE SECOND DATA STRUCTURE, ENCRYPT   │
│ THE SECOND DATA STRUCTURE, AND STORE THE ENCRYPTED SECOND DATA      │
│ STRUCTURE AT THE ADDRESS PROVIDED BY THE FIRST DESTINATION          │
│ OPERAND, AND UPDATE A STATUS OF THE INSTRUCTION IN THE SECOND       │
│ DESTINATION OPERAND  701                                            │
└─────────────────────────────────────────────────────────────────────┘
                                    │
                                    ▼
┌─────────────────────────────────────────────────────────────────────┐
│                     DECODE THE INSTRUCTION 703                      │
└─────────────────────────────────────────────────────────────────────┘
                                    │
                                    ▼
┌─────────────────────────────────────────────────────────────────────┐
│   RETRIEVE DATA ASSOCIATED WITH THE SOURCE OPERANDS AND SCHEDULE 705│
└─────────────────────────────────────────────────────────────────────┘
                                    │
                                    ▼
┌─────────────────────────────────────────────────────────────────────┐
│ EXECUTE THE DECODED INSTRUCTION(S) ACCORDING TO THE OPCODE TO STORE │
│ A FIRST AND A SECOND KEY INFORMATION FROM THE FIRST DATA STRUCTURE  │
│ INTO A SECOND DATA STRUCTURE, GENERATE A MAC OVER THE SECOND DATA   │
│ STRUCTURE, ENCRYPT THE SECOND DATA STRUCTURE, AND STORE THE         │
│ ENCRYPTED SECOND DATA STRUCTURE AT THE ADDRESS PROVIDED BY THE      │
│ FIRST DESTINATION OPERAND, AND UPDATE A STATUS OF THE INSTRUCTION   │
│ IN THE SECOND DESTINATION OPERAND  707                              │
└─────────────────────────────────────────────────────────────────────┘
                                    │
                                    ▼
┌─────────────────────────────────────────────────────────────────────┐
│              COMMIT A RESULT OF THE EXECUTED INSTRUCTION            │
│                                  709                                │
└─────────────────────────────────────────────────────────────────────┘
```

FIG. 7

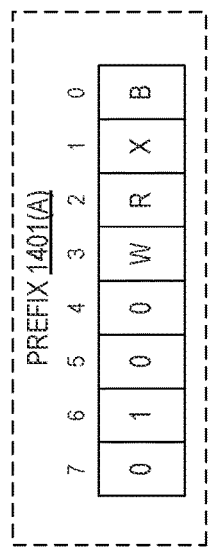
FIG. 16
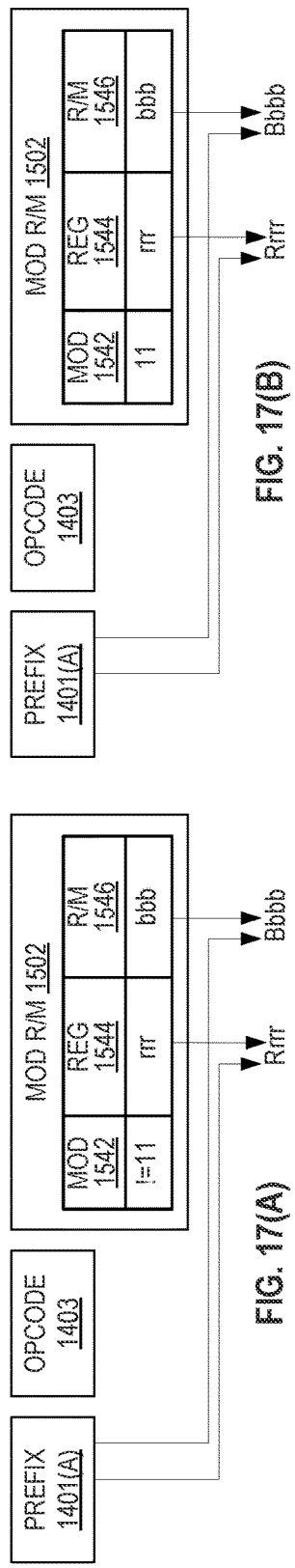
FIG. 17(A)
FIG. 17(B)
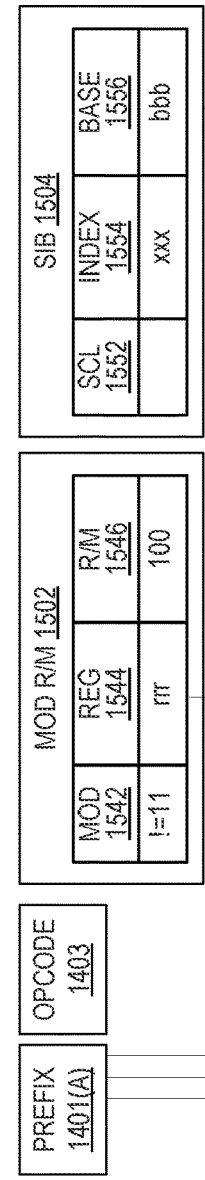
FIG. 17(C)
FIG. 17(D)

ISA SUPPORT FOR PROGRAMMING HARDWARE OVER UNTRUSTED LINKS

BACKGROUND 3D cross-point (3DXP) memories can provide persistent memory that can replace traditional disk drives among other usages such as memory expansion and may bus used in a 2 level memory (far memory) configuration where random access memory (RAM) is "near memory" and 3DXP is "far memory." 3DXP memories in addition to their persistence properties have high density allowing for multiple TBs of such memories on the platform resulting in performance and power efficiencies. On system bootup, a basic input/output system (BIOS) initializes all of memory with zeros to meet software expectation to get zero data on first read to memory. With typical systems having gigabytes of memory this process can be time consuming.

BRIEF DESCRIPTION OF DRAWINGS

Various embodiments in accordance with the present disclosure will be described with reference to the drawings, in which:

FIG. 7 illustrates an embodiment of method performed by a processor to process a WRAP_KEY instruction.

FIG. 16 illustrates embodiments of a first prefix.

FIGS. 17(A)-(D) illustrate embodiments of how the R, X, and B fields of the first prefix are used.

DETAILED DESCRIPTION

The present disclosure relates to methods, apparatus, systems, and non-transitory computer-readable storage media to encrypt and integrity protect zeroed data before storing it in near memory using an encryption engine in a far memory controller on receiving indication from the controller that the data being read from memory is being read for the first time.

As noted in the background, the zeroing of memory can negatively impact boot time for initialization. With 3DXP memories, when used as volatile memory, there can be multiple TBs of memory present on the platform to fully exploit the benefits of 3DXP memories. Initializing even 1 TB of memory may take around 4 minutes severely impacting user experience. To improve this experience with the impractically long initialization time for 3DXP memories, a feature known as fast-zero memory (FZM) is detailed herein where the memory controller maintains metadata to know when first read is sent to any location in 3DXP memory in a boot cycle alleviating the need for software initialization.

Figure 1:
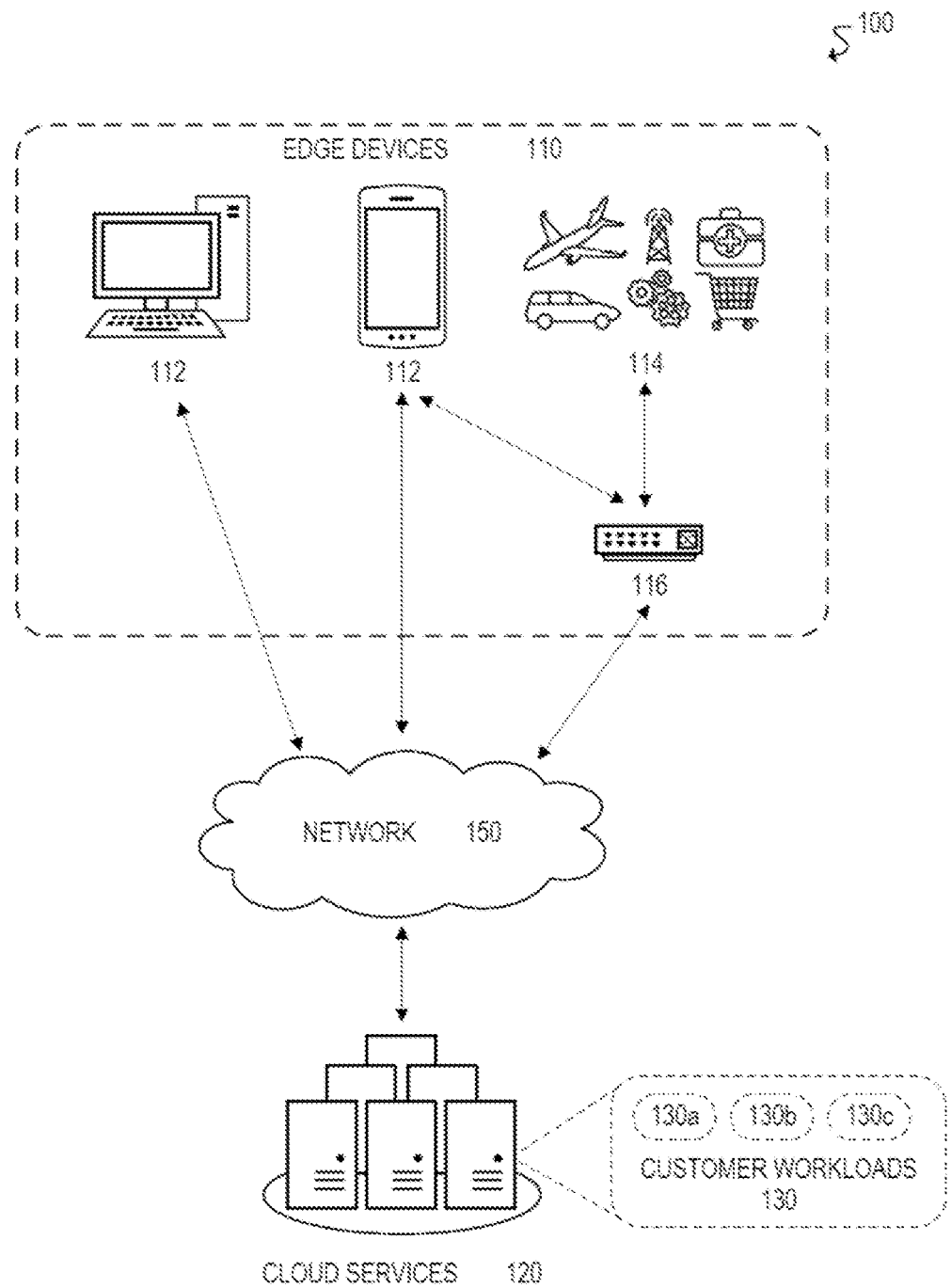
FIG. 1 illustrates a schematic diagram of an example computing system.

FIG. 1 illustrates a schematic diagram of an example computing system 100. In various embodiments, system 100 and/or its underlying components may include the cryptographic memory protection functionality described throughout this disclosure. For example, a cloud service provider 120 often hosts workloads 130 (e.g., data and/or applications) for multiple customers or third parties. Accordingly, in some embodiments, a cloud service provider 120 may implement multi-key cryptographic memory protection to provide memory encryption on a per-tenant basis, thus ensuring that each customer workload 130 is separately protected and isolated using a unique encryption key. Cryptographic memory protection can also be implemented by other components of system 100, such as edge devices 110. Example embodiments of cryptographic memory protection are described further throughout this disclosure in connection with the remaining FIGS.

The various components in the illustrated example of computing system 100 will now be discussed further below. Edge devices 110 may include any equipment and/or devices deployed or connected near the "edge" of a communication system 100. In the illustrated embodiment, edge devices 110 include end-user devices 112 (e.g., desktops, laptops, mobile devices), Internet-of-Things (IoT) devices 114, and gateways and/or routers 116, among other examples. Edge devices 110 may communicate with each other and/or with other remote networks and services (e.g., cloud services 120) through one or more networks and/or communication protocols, such as communication network 150. Moreover, in some embodiments, certain edge devices 110 may include the cryptographic memory protection functionality described throughout this disclosure.

End-user devices 112 may include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of system 100, such as with cloud services 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. For instance, a given sensor may be configured to detect one or more respective characteristics, such as movement, weight, physical contact, biometric properties, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, an IoT device 114 can also be any type of edge device 110, including end-user devices 112 and edge gateways and routers 116.

Edge gateways and/or routers 116 may be used to facilitate communication to and from edge devices 110. For example, gateways 116 may provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud services 120 using another wired or wireless communication medium (e.g., Ethernet, Wi-Fi, cellular). In some embodiments, a gateway 116 may be implemented by a dedicated gateway device, or by a general purpose device, such as another IoT device 114, end-user device 112, or other type of edge device 110.

In some instances, gateways 116 may also implement certain network management and/or application functionality (e.g., IoT management and/or IoT application functionality for IoT devices 114), either separately or in conjunction with other components, such as cloud services 120 and/or other edge devices 110. For example, in some embodiments, configuration parameters and/or application logic may be pushed or pulled to or from a gateway device 116, allowing IoT devices 114 (or other edge devices 110) within range or proximity of the gateway 116 to be configured for a particular IoT application or use case.

Cloud services 120 may include services that are hosted remotely over a network 150, or in the "cloud." In some embodiments, for example, cloud services 120 may be remotely hosted on servers in datacenter (e.g., application servers or database servers). Cloud services 120 may include any services that can be utilized by or for edge devices 110, including but not limited to, data and application hosting, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. Moreover, in some embodiments, certain cloud services 120 may include the cryptographic memory protection functionality described throughout this disclosure. For example, a cloud service provider 120 often hosts workloads 130 (e.g., data and/or applications) for multiple customers or third parties. Accordingly, in some embodiments, a cloud service provider 120 may implement multi-key cryptographic memory protection to provide memory encryption on a per-tenant basis, thus ensuring that each customer workload 130 is separately protected and isolated using a unique encryption key.

Network 150 may be used to facilitate communication between the components of computing system 100. For example, edge devices 110, such as end-user devices 112 and IoT devices 114, may use network 150 to communicate with each other and/or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
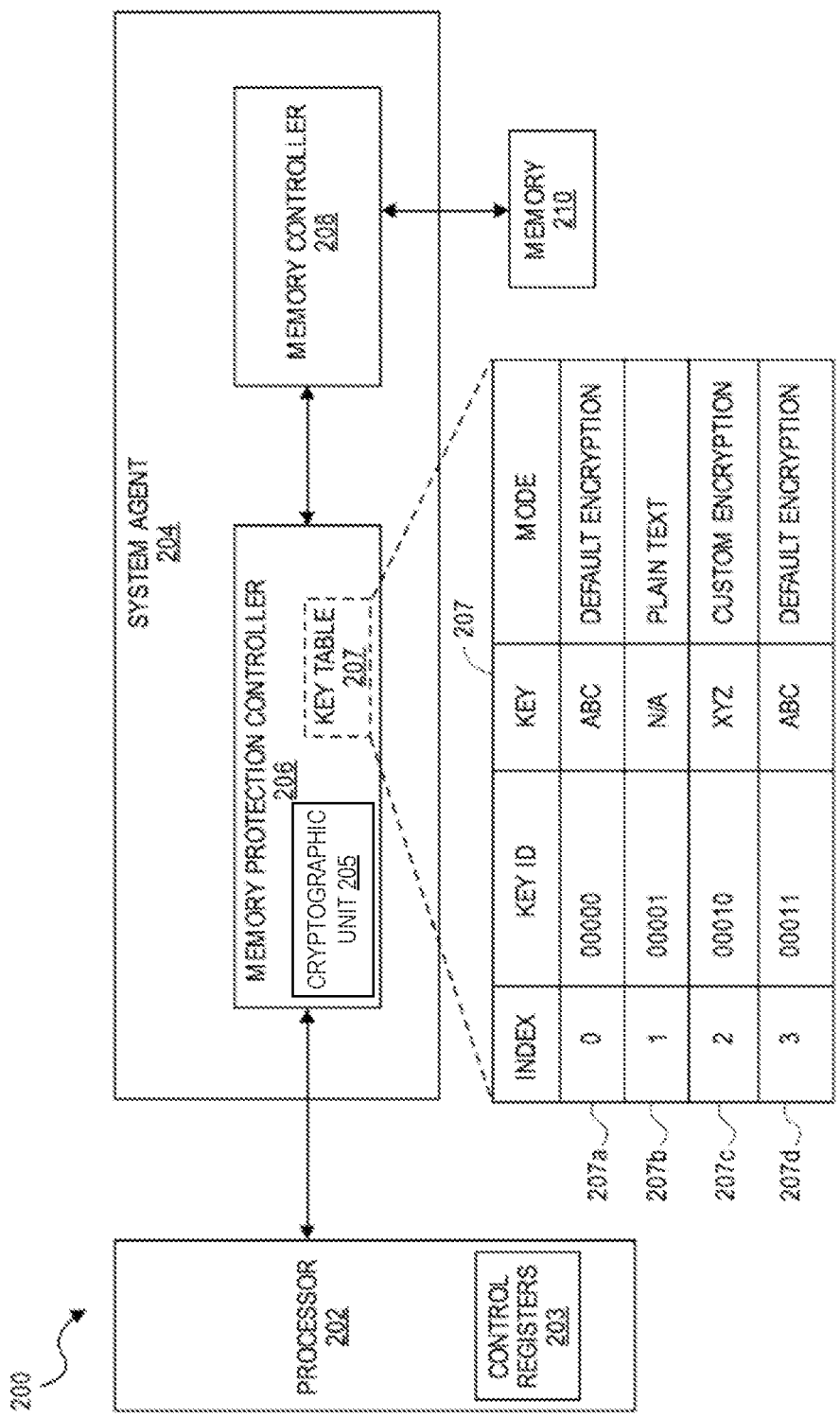
FIG. 2 illustrates an example embodiment of a multi-key cryptographic memory protection system.

FIG. 2 illustrates an example embodiment of a multi-key cryptographic memory protection system 200. In the illustrated embodiment, memory protection system 200 includes processor 202, system agent 204, and memory 210. As described further below, memory protection system 200 provides cryptographic protection of data stored on memory 210.

Processor 202 may be used to execute instructions, code, and/or any other form of logic or software, such as instructions associated with a software application. Processor 202 may include any combination of logic or processing elements operable to execute instructions, whether loaded from memory or implemented directly in hardware, such as a microprocessor, digital signal processor, field-programmable gate array (FPGA), graphics processing unit (GPU), programmable logic array (PLA), or application-specific integrated circuit (ASIC), among other examples. In some embodiments, for example, processor 202 and/or memory protection system 200 may be implemented using the computer architectures of FIGS. 6-10.

Memory 210 may be used to store information, such as code and/or data used by processor 202 during execution, and/or persistent data associated with an application or user of system 200. Memory 210 may include any type or combination of components capable of storing information, including volatile memory (e.g., random access memory (RAM), such as dynamic RAM (DRAM), synchronous dynamic RAM (SDRAM), and static RAM (SRAM)) and/or non-volatile memory (e.g., storage class memory (SCM), direct access storage (DAS) memory, non-volatile dual in-line memory modules (NVDIMM), and/or other forms of flash or solid-state storage).

System agent 204 may be used to provide various functions for processor 202, such as managing access to memory 210 and/or other resources of system 200. In the illustrated embodiment, for example, system agent 204 includes a memory controller 208 to control and/or manage access to memory 210 of system 200. Moreover, as described further below, system agent 204 also includes a memory protection controller 206 (sometimes called a multikey total memory encryption (MKTME) engine) to protect data stored on memory 210. In some embodiments, system agent 204 may also provide an interface between processor 202 and other components of system 200 (e.g., using a direct media interface (DMI) and/or PCI-Express bridge). In various embodiments, system agent 204 may include any combination of logic elements configured to perform functionality of system agent 204 described herein, whether loaded from memory or other non-transitory computer readable medium, or implemented directly in hardware, including by way of non-limiting examples: a microprocessor, digital signal processor (DSP), field-programmable gate array (FPGA), graphics processing unit (GPU), programmable logic array (PLA), application-specific integrated circuit (ASIC), and/or virtual machine (VM) processor. System agent 204 may be integrated with processor 202, or alternatively, system agent 204 may be implemented on a separate chip communicatively coupled or connected to processor 202.

Memory controller 208 may be used to control and/or manage access to memory 210 of system 200. In various embodiments, memory controller 208 may be implemented using any combination of hardware and/or software logic, including a microprocessor, application-specific integrated circuit (ASIC), field-programmable gate array (FPGA), programmable logic array (PLA), virtual machine (VM), and/or any other type of circuitry or logic.

In the illustrated embodiment, system 200 provides cryptographic memory protection for memory 210. In some embodiments, for example, cryptographic memory protection may be implemented by extending and/or modifying a particular computer architecture. For example, cryptographic memory protection may be implemented by extending the functionality of a processor 202 and/or introducing a memory protection controller 206. In the illustrated embodiment, for example, processor 202 is extended to support control registers 203 and processor instruction(s) that can be used to enable and/or configure cryptographic memory protection, and memory protection controller 206 is implemented to provide the cryptographic memory protection. Although the illustrated example uses separate logical blocks to depict memory protection controller 206 and processor 202, in actual embodiments memory protection controller 206 and processor 202 may be integrated together or alternatively may be implemented as separate components. In various embodiments, for example, memory protection controller 206 may be implemented using any combination of hardware and/or software logic, including a microprocessor, application-specific integrated circuit (ASIC), field-programmable gate array (FPGA), programmable logic array (PLA), virtual machine (VM), and/or any other type of circuitry or logic.

Memory protection controller 206 uses memory encryption to protect data stored on memory 210. In some embodiments, for example, memory protection controller 206 may be implemented on the memory path or memory bus to allow encryption of data transmitted to and from, and/or stored on, memory 210. Moreover, in some embodiments, memory protection controller 206 may be configurable or programmable, and may include support for multiple encryption keys. Accordingly, memory protection controller 206 may be configured or programmed (e.g., by software) to encrypt different regions or pages of memory 210 using different encryption keys and/or algorithms. In this manner, memory encryption can be provided and configured separately for different users, tenants, customers, applications, and/or workloads.

For example, in some embodiments, memory protection controller 206 may be used to define various secured or protected domains that can be separately configured and protected using memory encryption. In some embodiments, for example, a "domain" may be viewed as a collection of resources associated with a particular workload (e.g., a workload of a particular user or application), and may include any regions of memory containing data associated with the workload. For example, a protected domain for a customer workload of a cloud service provider may include resources (e.g., memory) associated with an operating system (O/S), virtual machine (VM) (e.g., a VM running on a virtual machine manager (VMM)), and/or any ring-3 applications running on the O/S or VM. Memory protection controller 206 may allow the protected domains to be configured and protected separately, thus allowing each protected domain to be cryptographically isolated in memory by encrypting its associated code and/or data with a unique encryption key. In this manner, the workloads of different users, customers, and/or tenants can be cryptographically isolated by defining different protection domains for the various workloads.

In some embodiments, the cryptographic memory protection of system 200 may be discovered and configured using processor instructions and/or hardware registers. For example, in some embodiments, a processor instruction may be used to determine whether cryptographic memory protection is supported by system 200, such as a CPU identification (CPUID) instruction used by software to identify the capabilities of a particular processor.

Upon determining that cryptographic memory protection is supported by system 200, the cryptographic memory protection may then be enabled and/or configured using hardware registers, such as control registers 203 of processor 202. For example, control registers 203 may include various model-specific registers (MSRs) that allow software to discover, enable, and/or configure the cryptographic memory protection capabilities of system 200. In some embodiments, for example, control registers 203 may include a memory encryption capability register, a memory encryption activation register, and/or one or more memory encryption exclusion registers, as described further below.

The memory encryption capability register (ME_CAPABILITY_MSR) may be used to allow software to discover the memory encryption capabilities of system 200. For example, software can read the ME_CAPABILITY_MSR (e.g., using a read MSR (RDMSR) instruction) to identify the supported encryption types and/or algorithms, the maximum number of encryption keys that can be used concurrently, and so forth. The table below illustrates an example embodiment of the memory encryption capability register (ME_CAPABILITY_MSR).

Memory Encryption Capability Register
(ME_CAPABILITY_MSR)

| FIELD | BIT INDEX | DESCRIPTION |
| --- | --- | --- |
| SUPPORTED ENCRYPTION ALGORITHMS | 0:15 | This field is used to identify supported encryption algorithms or encryption types. Each bit of this field (if used) corresponds to a particular encryption algorithm. For example, bit 0 may correspond to AES-XTS 128-bit encryption, bit 1 may correspond to AES-XTS 256-bit encryption, and so forth. A particular encryption algorithm is supported if the corresponding bit has a value of 1, and is unsupported if the corresponding bit has a value of 0. |
| RESERVED | 16:31 | These bits are unused and/or reserved (e.g., reserved for functionality extensions and/or other purposes). |
| MAX # OF KEY ID BITS (ME_MAX_KEYID_BITS) | 32:35 | This field is used to identify the maximum number of bits that can be used for KeyIDentifiers. More specifically, the value of this bit field represents the maximum number of higher order bits of a memory address that can be used as a key or domain identifier for memory encryption. For example, if this field has a value of 8 (binary 1000), the higher order 8 bits of a memory address can be used as a KeyIDentifier, thus supporting a total of 256 keys ($2^8 = 256$). Since this is a four-bit field, the maximum value is 15 (binary 1111), which allows support for up to ~32k keys ($2^{15} = 32,768$). The value of this field is 0 if multi-key memory encryption is not supported. |
| MAX # OF KEYS (ME_MAX_KEYS) | 36:50 | The value of this field represents the maximum number of encryption keys that can be used for memory encryption. This field can be used to specify a maximum number of keys that is less than the total number of supported keys (as specified by the ME_MAX_KEYID_BITS field above (bits 32:35)). For example, if the above ME_MAX_KEYID_BITS field has a value of 8, the total number of supported keys is 256 ($2^8 = 256$). However, if the present field (ME_MAX_KEYS) has a value of 200, then only 200 keys of the 256 total supported keys can be used. |

| FIELD | BIT INDEX | DESCRIPTION |
|---|---|---|
| RESERVED | 51:63 | The value of this field is 0 if multi-key memory encryption is not supported.<br>These bits are unused and/or reserved (e.g., reserved for functionality extensions and/or other purposes). |

The memory encryption activation register (ME_ACTIVATE_MSR) may be used to activate the cryptographic memory protection of system 200 (e.g., by setting the appropriate values in the register fields). The table below illustrates an example embodiment of the memory encryption activation register (ME_ACTIVATE_MSR).

Memory Encryption Activation Register (ME_ACTIVATE_MSR)

| FIELD | BIT INDEX | DESCRIPTION |
|---|---|---|
| READ-ONLY LOCK | 0 | This field is used to activate a read-only lock on the memory encryption configuration registers after memory encryption has been activated.<br>For example, the lock may be activated after memory encryption has been activated through a write to the ME_ACTIVATE_MSR register (e.g., using a write MSR or WRMSR instruction). The lock can be enabled by setting this bit field to 1, and the lock can be disabled by setting this bit field to 0.<br>The lock is applied to the ME_ACTIVATE_MSR, ME_EXCLUDE_BASE_MSR, and ME_EXCLUDE_MASK_MSR registers. Any writes to these registers will be ignored while the lock is active.<br>The lock is reset when the processor is reset. |
| ENABLE MEMORY ENCRYPTION | 1 | This field is used to enable or disable memory encryption. Memory encryption is enabled when this bit field has a value of 1, and is disabled when this bit field has a value of 0. |
| KEY SELECTION FOR DEFAULT MODE | 2 | This field is used to select a key to be used for default encryption mode. Memory regions protected using default encryption mode, for example, are protected uniformly using a default encryption algorithm and key.<br>If this bit field is set to 0, a new key is created (e.g., after a cold or warm boot).<br>If this bit field is set to 1, an existing key is restored from storage (e.g., after resuming from standby). |
| SAVE KEY FOR STANDBY | 3 | This field is used to specify whether the key used for default encryption mode should be saved in order to allow the key to be restored after resuming from standby.<br>If this bit field is set to 1, the key is saved. If this bit field is set to 0, the key is not saved. |
| ENCRYPTION ALGORITHM FOR DEFAULT MODE | 4:7 | This field can be used to specify the encryption algorithm to use for default encryption mode.<br>The value of this field identifies the bit index in the ME_CAPABILITY_MSR register that corresponds to the selected encryption algorithm.<br>For example, the supported encryption algorithms are identified by bits 0:15 of the ME_CAPABILITY_MSR register. For example, bit index 0 of the ME_CAPABILITY_MSR register may correspond to AES-XTS 128-bit encryption, bit index 1 may correspond to AES-XTS 256-bit encryption, and so forth.<br>If the present field has a value of 0 (binary 0000), the encryption algorithm corresponding to bit index 0 of the ME_CAPABILITY_MSR register is selected, which would be AES-XTS 128-bit encryption.<br>If the present field has a value of 1 (binary 0001), the encryption algorithm corresponding to bit index 1 of the ME_CAPABILITY_MSR register is selected, which would be AES-XTS 256-bit encryption.<br>The encryption algorithm selected using this field must be supported (e.g., its corresponding bit index in the ME_CAPABILITY_MSR register must be set to 1). |
| RESERVED | 8:31 | These bits are unused and/or reserved (e.g., reserved for functionality extensions and/or other purposes). |
| # OF KEY ID BITS (ME_KEYID_BITS) | 32:35 | This field is used to identify the number of bits that are used for KeyIDentifiers.<br>More specifically, the value of this field represents the number of higher order bits of a memory address that are used as a key or domain identifier for memory encryption.<br>This field can be used to specify a number of bits for KeyIDentifiers that is less than the maximum number of available bits for KeyIDentifiers (as specified by the |

| FIELD | BIT INDEX | DESCRIPTION |
|---|---|---|
| | | ME_MAX_KEYID_BITS field (bits 32:35) of the ME_CAPABILITY_MSR register). For example, if the present field has a value of 8 (binary 1000), the higher order 8 bits of a memory address are used as the KeyIDentifier, thus supporting a total of 256 keys ($2^8 = 256$). The value of this field is 0 if multi-key memory encryption is disabled. If multi-key memory encryption is disabled, but memory encryption in general is enabled (e.g., bit 1 of ME_ACTIVATE_MSR is set), then only default encryption mode is enabled (and custom or multi-key encryption is disabled). |
| RESERVED | 36:47 | These bits are unused and/or reserved (e.g., reserved for functionality extensions and/or other purposes). |
| ENCRYPTION RESTRICTION BITMASK | 48:63 | This field can be used to restrict the encryption algorithms that can be used for multi-key encryption. For example, the supported encryption algorithms are identified in the ME_CAPABILITY_MSR register (bits 0:15). The bits in the present field correspond to the bits of the ME_CAPABILITY_MSR register that are used to identify the supported encryption algorithms. In this manner, a supported encryption algorithm can be restricted from being used for multi-key encryption by clearing the corresponding bit in the present field (or alternatively, setting the corresponding bit). |

The memory encryption exclusion registers (ME_EXCLUDE_BASE_MSR and ME_EXCLUDE_MASK_MSR) may be used to exclude certain memory regions from the cryptographic memory protection provided by system 200. For example, in some embodiments, the exclusion registers may be used to identify a base memory address, and memory encryption may then be bypassed for memory addresses matching the base address (e.g., allowing the excluded or bypassed memory addresses to be accessed in plaintext mode).

The table below illustrates an example embodiment of the memory encryption exclusion mask register (ME_EXCLUDE_MASK_MSR), and the following table illustrates an example embodiment of the memory encryption exclusion base register (ME_EXCLUDE_BASE_MSR).

Memory Encryption Exclusion Mask Register
(ME_EXCLUDE_MASK_MSR)

| FIELD | BIT INDEX | DESCRIPTION |
|---|---|---|
| RESERVED | 0:10 | These bits are unused and/or reserved (e.g., reserved for functionality extensions and/or other purposes). |
| ENABLE EXCLUSION | 11 | This field can be used to enable or disable exclusions from memory encryption protection. When this field is set to 0, no memory addresses are excluded from memory encryption protection. When this field is set to 1, the ME_EXCLUDE_MASK_MSR and ME_EXCLUDE_BASE_MSR registers are used to define a memory range that is excluded from memory encryption protection. |
| EXCLUSION MASK | 12:(MAX ADDRESS SIZE − 1) | This field is used to identify the bits of a memory address that must match the EXCLUSION BASE (defined in the ME_EXCLUDE_BASE_MSR register) in order to qualify as an excluded memory range. For example, when accessing a particular memory address, the memory address can be AND-ed with the EXCLUSION MASK, and if the result matches the EXCLUSION BASE, memory encryption is bypassed for that memory address. |
| RESERVED | (MAX ADDRESS SIZE):63 | These bits are unused and/or reserved (e.g., reserved for functionality extensions and/or other purposes). |

Memory Encryption Exclusion Base Register
(ME_EXCLUDE_BASE_MSR)

| FIELD | BIT INDEX | DESCRIPTION |
|---|---|---|
| RESERVED | 0:11 | These bits are unused and/or reserved (e.g., reserved for functionality extensions and/or other purposes). |
| EXCLUSION BASE | 12:(MAX ADDRESS SIZE − 1) | This field is used to identify the base memory address of a particular memory range to exclude from memory encryption protection. |
| RESERVED | (MAX ADDRESS SIZE):63 | These bits are unused and/or reserved (e.g., reserved for functionality extensions and/or other purposes). |

In the illustrated embodiment, memory protection controller 206 maintains an internal domain key table 207 to identify protected domains that have been configured in system 200. The key table 207 may be implemented using any form of memory or storage (e.g., RAM), and may also be implemented directly on memory protection controller 206, in memory 210, and/or using another memory component.

The memory protection controller 206 includes a cryptographic unit 205 to use, or construct a tweak to be used in encryption/decryption. The memory protection controller 206 is arranged to use the tweak and a common key set to decrypt data specified by the read request with the encrypted memory address. Here, the common key set is a single set of keys used by the without regard to which of several tenants or tenant workloads is being encrypted or decrypted. For example, workload data for a first tenant is encrypted using the same key from the common key set as workload data for a second tenant. The difference between the encryption of these workloads is in the tenant, or domain, specific tweaks created from the tenant specific keyid-nonces from KeyID registration. In an example, the decryption is accomplished by performing Advanced Encryption Standard (AES) XEX-based tweaked-codebook mode with ciphertext stealing (XTS) (AES-XTS) decryption, where the AES-XTS keys K1 and K2 are in the common key set (e.g., the same K1 and K2 are used for all tenant workloads) and the tweak is unique across mutually distrusting domains. The following represents the traditional multi-key AES-XTS technique:

T=AES (K2, Tweak)
PP=P XOR T
CC=AES (K1, PP)
C=CC XOR T

Where P is the plaintext, C is the ciphertext generated, and K1 and K2 are domain-specific keys. Thus, in this last example, K1 and K2 are from the common key set and not domain specific keys, but the tweak is specific to the domains.

A similar set of techniques as those described above to read encrypted data from memory (e.g., DRAM, far memory, etc.) are used to encrypt data to store in memory. Thus, the system agent is arranged to receive a write request for the encrypted memory. Again, the write request includes the encrypted memory address. The system agent retrieves the KeyID-nonce from the key table 207 using the KeyID bits and constructs the tweak from the KeyID-nonce, the KeyID bits, and the physical address bits. The tweak, in conjunction with the common key set, are then used to encrypt data specified by the write request. The encrypted data may then be stored in the memory at the physical address in the encrypted memory address.

The entries 207a-d of domain key table 207 each correspond to a different protected domain. For example, each entry 207a-d includes a key or domain identifier (ID), a protection mode, and an associated encryption key (if applicable). In some embodiments, for example, a KeyID may represent the higher order bits of the memory addresses that are within the associated protected domain. For example, as discussed above, the ME_KEYID_BITS field of the ME_ACTIVATE_MSR register specifies the number of bits used for KeyIDs. In the illustrated example, each KeyID in domain key table 207 is represented using 5 bits. Accordingly, the protected domain associated with a given KeyID covers all memory addresses whose highest order 5 bits match the KeyID. In the illustrated embodiment, the KeyID is stored as a field in key table 207, but in alternative embodiments, the KeyID may be used as an index into key table 207 rather than being stored directly in key table 207.

Moreover, in some embodiments, multiple protection modes may be supported, and each protected domain may be protected using a particular protection mode. For example, in some embodiments, the supported protection modes may include plaintext mode (e.g., unencrypted), standard or default encryption mode (e.g., encrypted using a standard or default encryption key), and/or custom encryption mode (e.g., encrypted using a unique encryption key). Accordingly, key table 207 may identify the protection mode associated with each protected domain or KeyID.

For example, in the illustrated example, domain key table 207 includes four entries. The first entry identifies a protected domain corresponding to KeyID 00000 (thus covering all memory addresses that contain 00000 in the highest order 5 bits), which is protected in default encryption mode using key "ABC." The second entry identifies a protected domain corresponding to KeyID 00001 (thus covering all memory addresses that contain 00001 in the highest order 5 bits), which is protected in plaintext mode and thus does not have an associated encryption key. The third entry identifies a protected domain corresponding to KeyID 00010 (thus covering all memory addresses that contain 00010 in the highest order 5 bits), which is protected in custom encryption mode using key "XYZ." The fourth entry identifies a protected domain corresponding to KeyID 00011 (thus covering all memory addresses that contain 00011 in the highest order 5 bits), which is protected in default encryption mode using key "ABC." As shown by these examples, the domain protected using custom encryption mode has a unique key ("XYZ"), the domains protected using default encryption mode share an encryption key ("ABC"), and the domain protected in plaintext mode is unencrypted and thus has no associated key.

In some embodiments, protected domains may be defined and/or configured using a processor instruction implemented by processor 202, such as the "platform configuration" (PCONFIG) instruction described in connection with FIG. 3 and throughout this disclosure. The PCONFIG instruction, for example, may be used to define and/or configure a protected domain by programming a new entry—or modifying an existing entry—in key table 207 of memory protection controller 206. In this manner, protected domains can be defined and configured programmatically (e.g., by management software) using the PCONFIG instruction.

Figure 3:
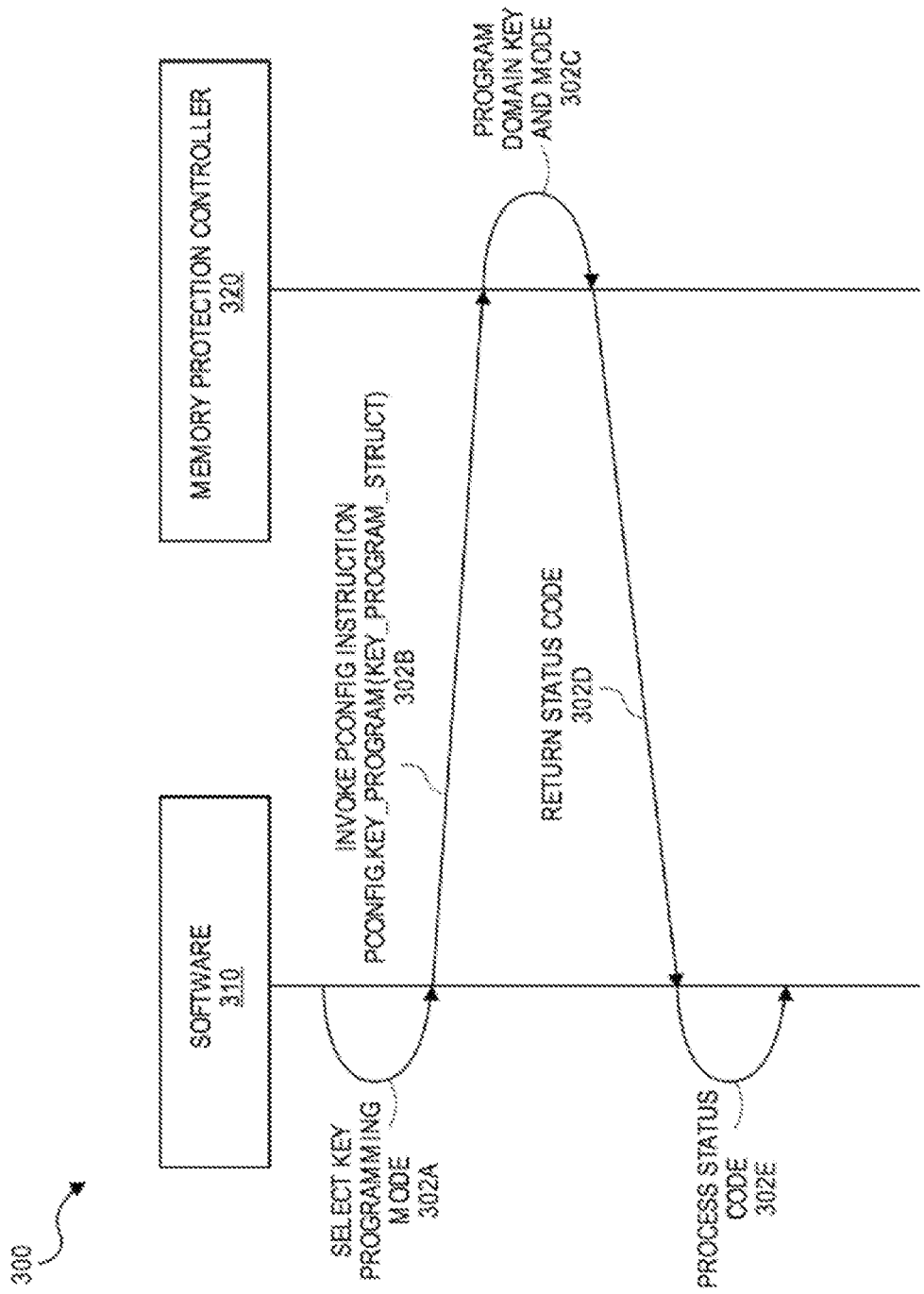
FIG. 3 illustrates an example of configuring a protected domain using a processor instruction.

FIG. 3 illustrates an example 300 of configuring a protected domain using a processor instruction. In some embodiments, for example, a processor may implement an instruction that can be used to configure the protected domains associated with a memory protection system. For example, the processor instruction could be a "platform configuration" (PCONFIG) instruction, a "trusted platform action supervisor" (TPAS) instruction, and/or any other suitable type of instruction.

A "platform configuration" (PCONFIG) instruction, for example, may be used to define and/or configure a protected domain by programming a new entry—or modifying an existing entry—in a domain key table of a memory protection controller (e.g., domain key table 207 of memory protection controller 206 from FIG. 2). In this manner, protected domains can be defined and configured programmatically using the PCONFIG instruction. Once a protected domain has been configured using the PCONFIG instruction, memory addresses associated with the protected domain are protected in the manner specified by the configuration for the protected domain. For example, when using encryption protection, data is encrypted before being written to memory addresses within the protected domain, and data read from memory addresses within the protected domain is decrypted before being returned to the requesting processor.

In some embodiments, the PCONFIG instruction may require a certain privilege level or privilege ring. For example, the processor may support a hierarchy of privilege levels or privilege rings to restrict access to certain resources. In some embodiments, privilege ring 0 may be the least restrictive level, while privilege rings with higher numbers may be increasingly more restrictive. For example, privilege ring 0 may be used for system management software (e.g., the operating system kernel and device drivers), while privilege ring 3 may be used for userland applications. Accordingly, in some embodiments, the PCONFIG instruction may be a ring-0 instruction that can only be used by software executing in the highest privilege ring (e.g., management software used to configure protected domains). Alternatively, or additionally, the PCONFIG instruction may be a ring-3 instruction that can be used by any userland application to configure its own protected domain.

FIG. 3 illustrates an example call flow 300 associated with the PCONFIG instruction. The illustrated example identifies the call flow 300 between software 310 performing domain configuration using the PCONFIG instruction and a memory protection controller 320. Memory protection controller 320 may include any engine, controller, or other component that provides cryptographic memory protection (e.g., memory protection controller 206 of FIG. 2). Software 310 may include any software used to configure the domains protected by memory protection controller 320, such as a virtual machine manager and/or other management software. The illustrated call flow begins by software 310 selecting a key programming mode for programming an encryption key for a particular domain (call 302a). For example, as discussed further below, software 310 may directly specify a key for the domain, or may request that a random key be generated. Software 310 may then invoke the PCONFIG processor instruction to perform the domain configuration (call 302b). When the PCONFIG instruction is invoked, memory protection controller 320 programs the key and protection mode for the particular domain (call 302c). Memory protection controller 320 then returns a status code to software 310 (call 302d), and the status code is then processed by software 310 (call 302e).

In some embodiments, the PCONFIG instruction may support various leaf functions for configuring and managing protected domains. When the PCONFIG instruction is executed, for example, the particular leaf function to invoke may be specified in a hardware register (e.g., the EAX register). In some embodiments, the parameters used by a particular leaf function may also be specified in hardware registers (e.g., the RBX/RCX/RDX registers).

The table below illustrates an example of PCONFIG leaf encodings that could be used to enable support for multiple leaf functions. Although only one leaf function is shown (the KEY_PROGRAM leaf), additional leaf functions can be defined using the reserved leaf encodings to extend the functionality of the PCONFIG instruction.

PCONFIG Leaf Function Encodings

| LEAF | ENCODING | DESCRIPTION |
| --- | --- | --- |
| KEY_PROGRAM | 0x00000000 | This leaf function is used to program the key associated with a domain. |
| OTHER | 0x00000001-0xFFFFFFFF | Additional leaf functions can be defined using these reserved leaf encodings for future extensions to the functionality of the PCONFIG instruction. |

The key program leaf function (KEY_PROGRAM) of the PCONFIG instruction can be used to program a key for a protected domain. In some embodiments, the parameters used by the key program leaf function may be specified in a key program structure (KEY_PROGRAM_STRUCT), and the address of the key program structure may be specified in a hardware register (e.g., the RBX register). The table below illustrates an example embodiment of the key program structure (KEY_PROGRAM_STRUCT).

Key Program Structure
(KEY_PROGRAM_STRUCT)

| Field | Offset (bytes) | Size (bytes) | Comments |
| --- | --- | --- | --- |
| KEYID | 0 | 2 | Key Identifier |
| KEYID_CTRL | 2 | 4 | KeyID control: Bits [7:0]: COMMAND Bits [23:8]: ENC_ALG Bits [31:24]: RSVD, MBZ |
| RSVD | 6 | 58 | RSVD |
| KEY_FIELD_1 | 64 | 64 | SW- supplied KeyID data key or entropy for KeyID data Key |
| KEY_FIELD_2 | 128 | 64 | SW-supplied tweak key or entropy for KeyID tweak Key |

As shown, the key program structure identifies the KeyID of the particular domain being programmed, and it also specifies a key programming command. In some embodiments, for example, the key program leaf function may support multiple key programming commands, and the desired command may be specified in the key program structure. Moreover, in some embodiments, the key program structure may also include reserved field(s) that can be used for subsequent extensions to the key program leaf function.

The table below illustrates examples of key programming commands that may be supported by the key program leaf function.

Key Programming Commands

| KEY DOMAIN (KD) COMMAND | ENCODING | DESCRIPTION |
| --- | --- | --- |
| Set Key Direct (KD_SET_KEY_DIRECT) | 0 | This command sets the key for a domain directly using the key specified in the key program structure (KEY_PROGRAM_STRUCT). The key is provided by the software that initiates this key programming command. |

-continued

| KEY DOMAIN (KD) COMMAND | ENCODING | DESCRIPTION |
|---|---|---|
| Set Key Random (KD_SET_KEY_RANDOM) | 1 | The domain is then protected in custom encryption mode. This command sets the key for a domain using a randomly generated key. For example, a key may be randomly generated by a processor and/or a random number generator, and thus may not be known by (or shared with) the software that initiates the key programming command. The domain is then protected in custom encryption mode. |
| Clear Key (KD_CLEAR_KEY) | 2 | This command clears the key that was previously set for a domain. The domain is then protected in default encryption mode. |
| No Key (KD_NO_KEY) | 3 | This command disables memory encryption for a domain. The domain is then protected in plaintext mode. |

After the key program leaf function is executed, a return value or status code may be specified in a hardware register to indicate whether the key program function was successful. The table below illustrates examples of the status codes that may be returned by the key program leaf function.

Status Codes Returned by Key Program Leaf Function (KEY_PROGRAM)

| STATUS CODE | ENCODING | DESCRIPTION |
|---|---|---|
| PROG_SUCCESS | 0 | The domain is programmed successfully. |
| INVALID_PROG_CMD | 1 | The key programming command is invalid. |
| ENTROPY_ERROR | 2 | The entropy of a randomly generated key is insufficient. |
| INVALID_KEYID | 3 | The domain KeyID is invalid. |
| INVALID_ENC_ALG | 4 | An invalid encryption algorithm is selected. |
| DEVICE_BUSY | 5 | A lock for the domain key table cannot be obtained. |

While the illustrated embodiment uses the PCONFIG processor instruction to perform domain configuration, other embodiments may use alternative and/or additional approaches for domain configuration. For example, in some embodiments, domain configuration may be performed using hardware registers. For example, a PCONFIG model-specific register (MSR) may be implemented for performing domain configuration, allowing software to invoke the PCONFIG operation by writing to the PCONFIG MSR (e.g., executing a WRMSR instruction with the index for the PCONFIG MSR passed in a register, such as the ECX register). Moreover, certain parameters for the PCONFIG operation (and its associated leaf functions and commands) may be passed in hardware registers. For example, the address of the key program structure (KEY_PROGRAM_STRUCT) can be passed in a hardware register, such as the EDX register, EAX register, or both of those registers (e.g., for 64-bit memory addresses). The PCONFIG operation can then be performed in a similar manner as described above.

Moreover, in some embodiments, a PCONFIG operation may utilize wrapped blobs for domain key programming. In this manner, domain keys can be programmed without revealing the keys to management software. In some embodiments, for example, additional PCONFIG leaf functions may be implemented to enable keys to be wrapped and then subsequently programmed to memory protection controller 320 after being unwrapped.

Example pseudocode for implementing the PCONFIG instruction is provided below:

```
// #UD (undefined opcode exception) if PCONFIG is not enumerated or in VM86, or CPL>0
if (CPUID.7.0:ECX[PCONFIG] == 0 OR RFLAGS.VM == 1 OR CPL > 0) #UD;
if (in VMX non-root mode)
{
  if (VMCS.PCONFIG)
  {
  if ((EAX > 62 AND VMCS.PCONFIG_EXITING[63] ==1) OR
      (EAX < 63 AND VMCS.PCONFIG_EXITING[EAX] == 1))
  {
  Set VMCS.EXIT_REASON = PCONFIG; //No Exit qualification
  Deliver VMEXIT;
  }
   }
```

-continued

```
  else
  {
  #UD
  }
}
// #GP(0) (general protection fault) for an unsupported leaf
if (EAX != 0) #GP(0)
// KEY_PROGRAM leaf flow
if (EAX == 0)
{
//#GP(0) if ME_ACTIVATE_MSR is not locked or does not enable memory encryption (ME) or
multiple keys are not enabled
if (ME_ACTIVATE_MSR.LOCK != 1 OR ME_ACTIVATE_MSR.ENABLE != 1 OR
ME_ACTIVATE_MSR.ME_KEYID_BITS == 0) #GP(0)
  // Check KEY_PROGRAM_STRUCT is 256B aligned
  if(DS:RBX is not 256B aligned) #GP(0);
  // Check that KEY_PROGRAM_STRUCT is read accessible
  <<DS: RBX should be read accessible>>
  // Copy KEY_PROGRAM_STRUCT to a temporary variable
  TMP_KEY_PROGRAM_STRUCT = DS:RBX.*;
  // RSVD field check
  if(TMP_KEY_PROGRAM_STRUCT.RSVD != 0) #GP(0);
  if(TMP_KEY_PROGRAM_STRUCT.USUPP_KEYID_KEY.BYTES[63:16] != 0) #GP(0);
     if(TMP_KEY_PROGRAM_STRUCT.USUPP_KEYID_TWEAK_KEY.BYTES[63:16] != 0)
#GP(0);
// Check for a valid command
if(TMP_KEY_PROGRAM_STRUCT.KEYID_CMD.COMMAND is not a valid command)
{
  RFLAGS.ZF = 1;
  RAX = INVALID_PROG_CMD;
     goto EXIT;
}
// Check that the KEYID being operated upon is a valid KEYID
if(TMP_KEY_PROGRAM_STRUCT.KEYID >
2^ME_ACTIVATE_MSR.ME_KEYID_BITS -1
OR TMP_KEY_PROGRAM_STRUCT.KEYID >
ME_CAPABILITY_MSR.ME_MAX_KEYS
OR TMP_KEY_PROGRAM_STRUCT.KEYID == 0)
{
RFLAGS.ZF = 1;
     RAX = INVALID_KEYID;
     goto EXIT;
}
// Check that only one algorithm is requested for the KEYID domain and it is one of the activated
algorithms
if(NUM_BITS(TMP_KEY_PROGRAM_STRUCT.KEYID_CMD.ENC_ALG) != 1 ||
(TMP_KEY_PROGRAM_STRUCT.KEYID_CMD.ENC_ALG &
ME_ACTIVATE_MSR.ME_ALG_ENABLE ==0))
{
RFLAGS.ZF = 1;
     RAX = INVALID_ENC_ALG;
     goto EXIT;
}
// Try to acquire exclusive lock
if (NOT KEY_TABLE_LOCK.ACQUIRE(WRITE))
{
  // PCONFIG failure
  RFLAGS.ZF = 1;
  RAX = DEVICE_BUSY;
  goto EXIT;
}
// Lock is acquired
switch(TMP_KEY_PROGRAM_STRUCT.KEYID_CMD.COMMAND)
{
case KD_SET_KEY_DIRECT:
   <<Write
KEY=TMP_KEY_PROGRAM_STRUCT.USUPP_KEYID_KEY,
TWEAK_KEY=TMP_KEY_PROGRAM_STRUCT.USUPP_KEYID_TWEAK_KEY,
KEY_CONTROL=2'b01,
to ME Key table at index TMP_KEY_PROGRAM_STRUCT.KEYID
>>
```

```
// Do a read to guarantee completion of previous writes
<<Read KEY_CONTROL bits at index TMP_KEY_PROGRAM_STRUCT.KEYID>>
    break;
case KD_SET_KEY_RANDOM:
TMP_RND_KEY = <<Generate a random key using RDSEED>>
        if (NOT ENOUGH ENTROPY)
        {
RFLAGS.ZF = 1;
        RAX = ENTROPY_ERROR;
        goto EXIT;
}
TMP_RND_TWEAK_KEY = <<Generate a random key using RDSEED>>
        if (NOT ENOUGH ENTROPY)
        {
RFLAGS.ZF = 1;
        RAX = ENTROPY_ERROR;
        goto EXIT;
}
// Mix user supplied entropy to the data key and tweak key
TMP_RND_KEY = TMP_RND_KEY XOR
TMP_KEY_PROGRAM_STRUCT.USUPP_KEYID_KEY.BYTES[15:0];
TMP_RND_TWEAK_KEY = TMP_RND_TWEAK_KEY XOR
TMP_KEY_PROGRAM_STRUCT.USUPP_KEYID_TWEAK_KEY.BYTES[15:0];
<<Write
KEY=TMP_RND_KEY,
TWEAK_KEY=TMP_RND_TWEAK_KEY,
KEY_CONTROL=2'b01,
to ME_KEY_TABLE at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
case KD_CLEAR_KEY:
        <<Write
KEY='0,
        TWEAK_KEY='0,
KEY_CONTROL = 2'b00,
to ME_KEY_TABLE at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
case KD_NO_KEY:
    <<Write
KEY_CONTROL=2'b11,
to ME Key table at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
}
RAX = 0;
RFLAGS.ZF = 0;
// Release Lock
KEY_TABLE_LOCK(RELEASE);
EXIT:
RFLAGS.CF=0;
RFLAGS.PF=0;
RFLAGS.AF=0;
RFLAGS.OF=0;
RFLAGS.SF=0;
}
```

In some embodiments, memory encryption techniques are applied to memory other than RAM. In particular, applied to far memory such as 3DXP or other large memory that may be used as volatile memory. 3DXP memories can provide persistent memory that can replace traditional disk drives among other usages such as memory expansion. 3DXP memories in addition to their persistence properties have high density allowing for multiple TBs of such memories on a platform resulting in performance and power efficiencies. On system bootup, BIOS initializes all of memory with zeros to meet software expectation to get zero data on first read to memory.

In order to deal with the impractically long initialization time for 3DXP memories, a feature known as fast-zero memory (FZM) is implemented where the memory controller maintains metadata to know when a first read is sent to any location in 3DXP memory in a boot cycle alleviating the need for software initialization.

With FZM in use, the first read from far memory will get cached in near memory as all zeros and the zeros will then get decrypted to garbage by the encryption engine before returning to the software, thereby breaking the software assumption of reading all zeros on the first read. Even if an indication is sent to the encryption engine to return zeros on first read, the near memory will cache all zeros, breaking the encryption promise of storing everything encrypted in memory. For this reason, FZM is mutually exclusive with memory encryption and integrity. Memory integrity introduces other challenges where the message authentication code (MAC) associated with data needs to pass the integrity checking at the encryption engine for the decrypted data to be sent to the requestor.

In embodiments detailed herein describe an encryption architecture with fast zero support (e.g., FZ-MKTME) to allow memory encryption and integrity architecture to work efficiently with 3DXP or other far memory memories. In particular, an encryption engine for the purpose of fast zeroing in the far memory controller is detailed along with mechanisms for consistent key programming of this engine. For example, an instruction is detailed which allows software to send keys protected even when the controller is located outside of a system on a chip (SoC), etc.

Figure 4:
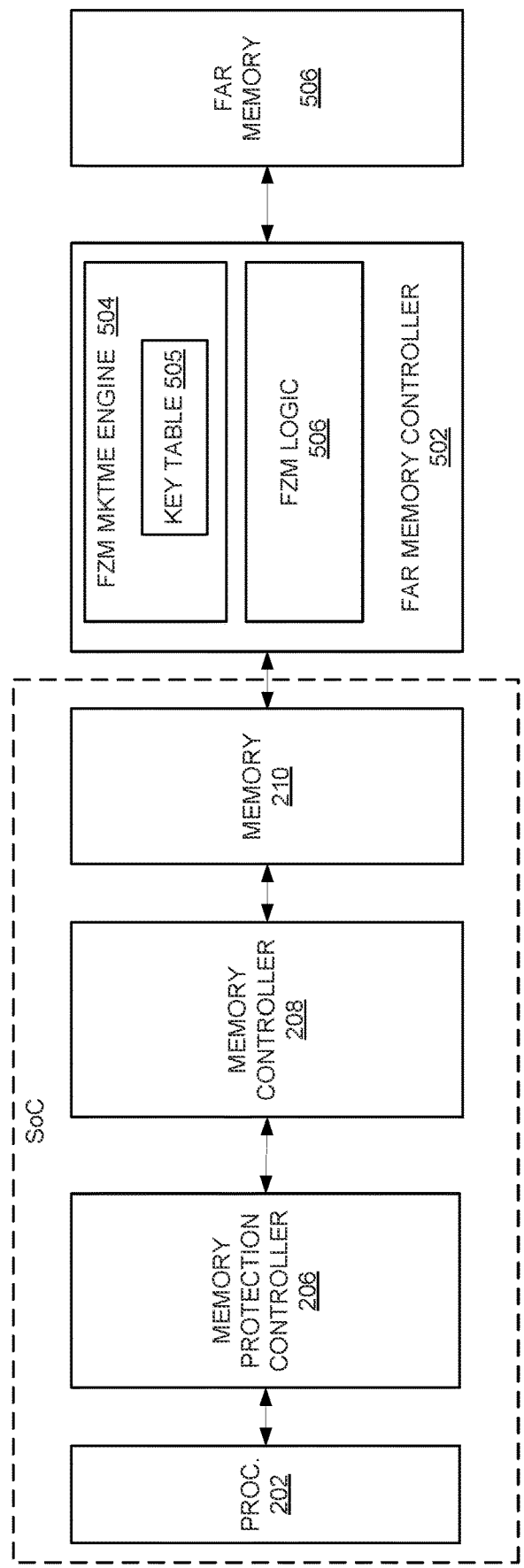
FIG. 4 illustrates embodiments of a system that includes an encryption engine that provides fast zero support.

FIG. 4 illustrates embodiments of a system that includes an encryption engine that provides fast zero support. Note that some of the aspects of this system are the same as FIG. 2 and are not detailed again. Logically coupled to memory 210 is a far memory controller 402. This far memory controller 402 reads and writes far memory 406. Within the far memory controller 402 is a FZM MKTME engine (a multi-key encryption engine similar in nature to the memory protection controller 206) that supports fast zeroing 404. On receiving a FZM indication that data being read from memory is being read for the first time from the FZM logic 406 (which tracks access), the FZM MKTME 404 will encrypt and integrity protect zeroed data before storing it in near memory (memory 210). The identifier of the key to be used is carried along with the physical address in the top-order address bits and the FZM MKTME engine 404 uses these bits to index a key table 405 (similar to the one in FIG. 2) that is programmed with the keys associated with each of the KeyIDs.

Figure 5:
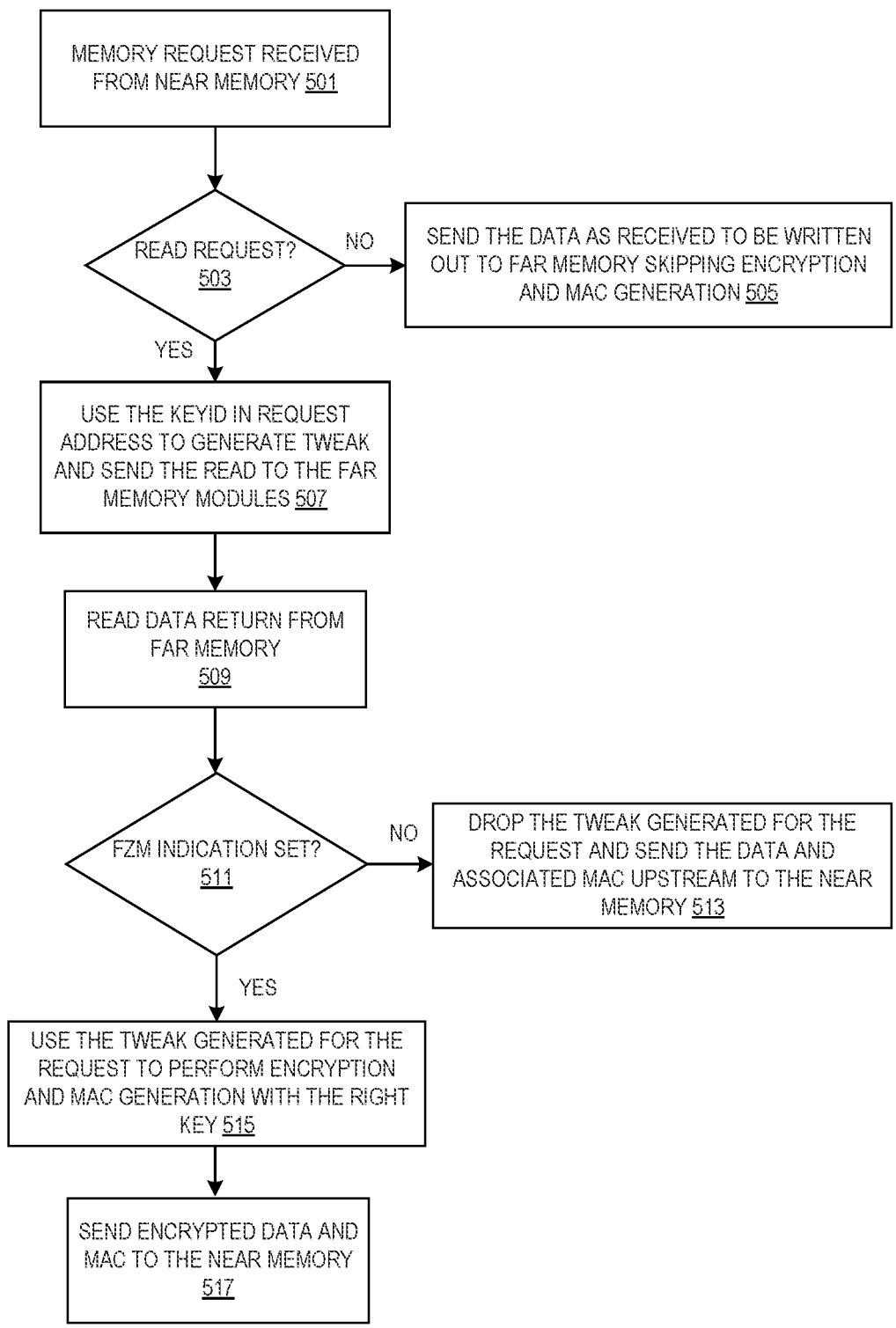
FIG. 5 illustrates embodiments of a method for processing reads and writes using an FZM-MKTME engine.

FIG. 5 illustrates embodiments of a method for processing reads and writes using an FZM-MKTME engine. On receiving a request from the near memory controller (a miss in near memory) at 501, the FZM-MKTME engine checks if the request is a read or a write request at 503. When the request is a write request, the near memory encryption engine (e.g., memory protection controller 206) would have encrypted and integrity protected the write data and sent the ciphertext along with the associated MAC to the far memory controller 502. As such, the ciphertext along with the associated MAC to be stored in far memory.

When a read request is received from the near memory controller, the FZ-MKTME engine starts tweak generation using a key associated with the KeyID in the physical address received with the request and sends a read request to the far memory at the physical address at 507. This is in anticipation that the read is a first read from memory and hence will require further processing at the FZ-MKTME engine.

On data return from the far memory at 509, the FZ-MKTME engine determines whether the FZM indication is set indicating the first read for the location from the far memory at 511. If not set, the FZ-MKTME engine drops the tweak value that it generated in the anticipation that it would be first read from memory at 513 and sends the received data and associated MAC from the far memory upstream to near memory.

When the FZM indication is set, the FZ-MKTME engine uses the tweak generated to encrypt the returned data and generate an associated MAC for the encrypted zeroed data at 515. The encrypted zeros and MAC are then sent to the near memory at 517 for storage and further to the MKTME engine memory protection controller 206) behind the near memory to decrypt and correctly return zeros to the requesting agent.

Note that some embodiments, the FZ-MKTME engine can optimize for power and not performance where instead of assuming that the read is the first read to memory and start generating the tweak on receiving a read request, it can wait to receive the FZM indication from memory and only if it is set, it generates the tweak to perform the encryption and MAC generation.

Figure 6:
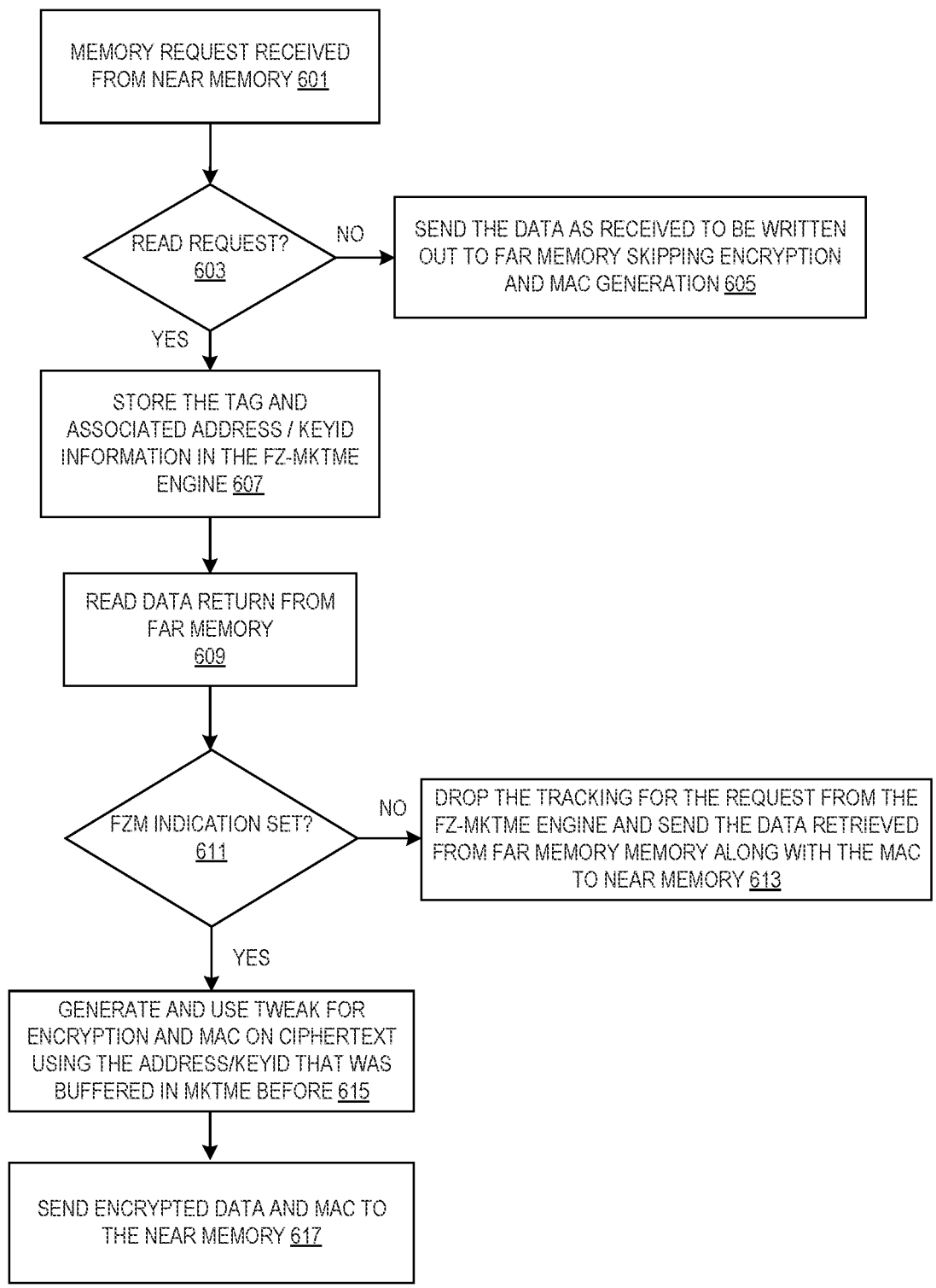
FIG. 6 illustrates embodiments of a method for processing reads and writes using an FZM-MKTME engine.

FIG. 6 illustrates embodiments of a method for processing reads and writes using an FZM-MKTME engine. On receiving a request from the near memory controller (a miss in near memory) at 601, the FZM-MKTME engine checks if the request is a read or a write request at 603. When the request is a write request, the near memory encryption engine (e.g., memory protection controller 206) would have encrypted and integrity protected the write data and sent the ciphertext along with the associated MAC to the far memory controller 502. As such, the ciphertext along with the associated MAC to be stored in far memory.

When a read request is received from the near memory controller, the FZ-MKTME stores a tag (request ID) and associated KeyID and address information at 607. A read request is sent to the far memory at the physical address at 507.

On data return from the far memory at 609, the FZ-MKTME engine determines whether the FZM indication is set indicating a first read for the location from the far memory at 611. If not set, the FZ-MKTME engine drops tracking for the request and sends the data retrieved from the far memory to near memory at 613.

When the FZM indication is set, the FZ-MKTME engine generates a tweak to encrypt the returned data (and encrypts the data) and generates an associated MAC using the identified key at 615. The encrypted data and MAC are then sent to the near memory for storage and further to the MKTME engine memory protection controller 206) behind the near memory at 617.

In some embodiments, the FZ-MKTME engine needs to be programmed. For example, the KeyIDs and associated keys need to be programmed consistently between the near memory and FZ-MKTME engine. In some embodiments, the PCONFIG instruction detailed above is used to program the FZ-MKTME engine. In other embodiments, for example when the far memory controller is not on the same SoC or die as the MTKME engine, a WRAP_KEY instruction is used. The WRAP_KEY instruction takes an input and wraps it with a key and provides the encrypted and integrity protected blob back as output.

The table below shows embodiments of key programming structure (KEY_PROGRAM_STRUCT_TOWRAP) used by the WRAP_KEY instruction:

Key Program Structure
(KEY_PROGRAM_STRUCT_TOWRAP)

| FIELD | OFFSET (BYTES) | SIZE (BYTES) | DESCRIPTION |
|---|---|---|---|
| KEYID | 0 | 2 | This field identifies the KeyID of a domain that is being programmed. |
| KEYID_CTRL | 2 | 4 | KeyID control:<br>Bits [7:0] = command<br>Bits [23:8] = Encrypt algorithm<br>Bits [31:24] = Reserved |
| RSVD | 6 | 58 | RSVD |
| KEY_FIELD_1 | 64 | 64 | Software supplied KeyID data key or entropy for KeyID data key |
| KEY_FIELD_2 | 128 | 64 | Software supplied KeyID tweak key or entropy for KeyID tweak key |
| MAC | 192 | 256 | MAC over the key programming structure |

The KEYID field identifies the KeyID of a domain that is being programmed.

The KEYID_CTRL field carries two sub-fields used by software to control the behavior of a KeyID a command and a KeyID encryption algorithm identifier. The command used controls the encryption mode for a KeyID. The encryption (cryptographic) algorithm field allows software to select one of the activated cryptographic algorithms for the KeyID. As discussed previously, the BIOS can activate a set of algorithms to allow for use when programming keys using a MSR (such as TME_ACTIVATE MSR).

The KEY_FIELD_1 field is for the software supplied data key to be used for the KeyID when a direct key programming option is used (KEYID_SET_KEY_DIRECT). When a random key programming option is used (KEYID_SET_KEY_RANDOM), this field carries software supplied entropy to be mixed in the CPU generated random data key. It is software's responsibility to ensure that the key supplied for the direct programming option or the entropy supplied for the random programming option does not result in weak keys. When AES XTS-128 is used, the upper 48B are treated as reserved and are zeroed out by software before executing the instruction in some embodiments.

The KEY_FIELD_2 field carries the software supplied tweak key to be used for the KeyID when a direct key programming option is used (KEYID_SET_KEY_DIRECT). When a random key programming option is used (KEYID_SET_KEY_RANDOM), this field carries software supplied entropy to be mixed in the CPU generated random tweak key. It is software's responsibility to ensure that the key supplied for the direct programming option or the entropy supplied for the random programming option does not result in weak keys. When AES XTS-128 is used, the upper 48B are treated as reserved and are zeroed out by software before executing the instruction in some embodiments.

The MAC field stores a MAC over the key programming structure.

In some embodiments, the WRAP_KEY instruction uses the following operands, a first source (e.g., a register or memory location) location of an input structure (KEY_PROGRAM_STRUCT_TOWRAP), a first destination (e.g., a register or memory location) location to store output structure (KEY_PROGRAM_STRUCT_TOWRAP), and a second destination. In particular, the WRAP_KEY instruction includes one or more fields to identify these sources and destination. The opcode of the WRAP_KEY instruction indicates that execution circuitry is to store the KEY_FIELD1 and KEY_FIELD2 fields from the input structure into the output structure, generate a MAC over the output structure, and integrity protect the entire structure by encrypting the structure using a session key. This generates a blob to be stored at the location provided by the second source. Note the session key is stored in secure storage on a processor.

An authenticated encryption algorithm (e.g., AES-GCM) can be used for this wrapping. The address of wrapped blob generated out of the WRAP_KEY instruction can then be provided to untrusted software. In some embodiments, untrusted software programs the wrapped blob using regular MMIO to the far memory controller. Note that since the blob (carrying the KeyID information) is encrypted, t is no information leakage as the blob is transmitted through untrusted software. The far memory controller then has the requirement to provide MMIO registers to receive the blob and on receiving the blob use the session key to decrypt and integrity verify the blob and upon successful verification, and program the KeyID information (including the key associated with the KeyID) to the FZ-MKTME engine.

Note that the key programming scheme introduced in this invention can be extended to just memory expanders. It can also be used for third party devices which implement their own memory encryption engines for protecting the memory attached to the device. In other words, the key programming disclosed is generic and can be used for programming keys across unprotected links.

FIG. 7 illustrates an embodiment of method performed by a processor to process a WRAP_KEY instruction. For example, a processor core as shown in FIG. 11(B), a pipeline as detailed below, etc. performs this method.

At 701, an instruction is fetched. For example, a WRAP_KEY instruction is fetched. The WRP instruction includes fields for an opcode, one or more fields to identify of a destination operand, one or more fields to identify a first source operand, first destination operand, and a second destination operand. The first source operand is to store an address of first data structure, the first destination operand is to store an address of a result execution of the instruction. The opcode is to indicate that execution circuitry is to store a first and a second key information (e.g., KEY_FIELD1 and KEYFIELD2) from the first data structure into a second data structure, generate a MAC over the second data structure, encrypt the second data structure, and store the encrypted second data structure at the address provided by the first destination operand. In some embodiments, the operands are registers (e.g., RAX, RBX, and RCX). In some embodiments, one or more of the operands are memory locations. The second destination operand is to store operational status of the instruction. In some embodiments, the encryption key used to encrypt the second data structure is a session key.

The fetched instruction is decoded at 703. For example, the fetched WRAP_KEY instruction is decoded by decode circuitry such as that detailed herein.

Data values associated with the source operands of the decoded instruction are retrieved at 705. For example, when one or more of the source operands are memory operands, the data from the indicated memory location is retrieved.

At 707, the decoded instruction is executed by execution circuitry (hardware) such as that detailed herein. For the WRAP_KEY instruction, the execution will cause execution circuitry to execute the decoded instruction according to the opcode to store a first and a second key information from the first data structure into a second data structure, generate a mac over the second data structure, encrypt the second data structure, and store the encrypted second data structure at the address provided by the first destination operand, and update a status of the instruction in the second destination operand.

In some embodiments, the instruction is committed or retired at 709.

Figure 8:
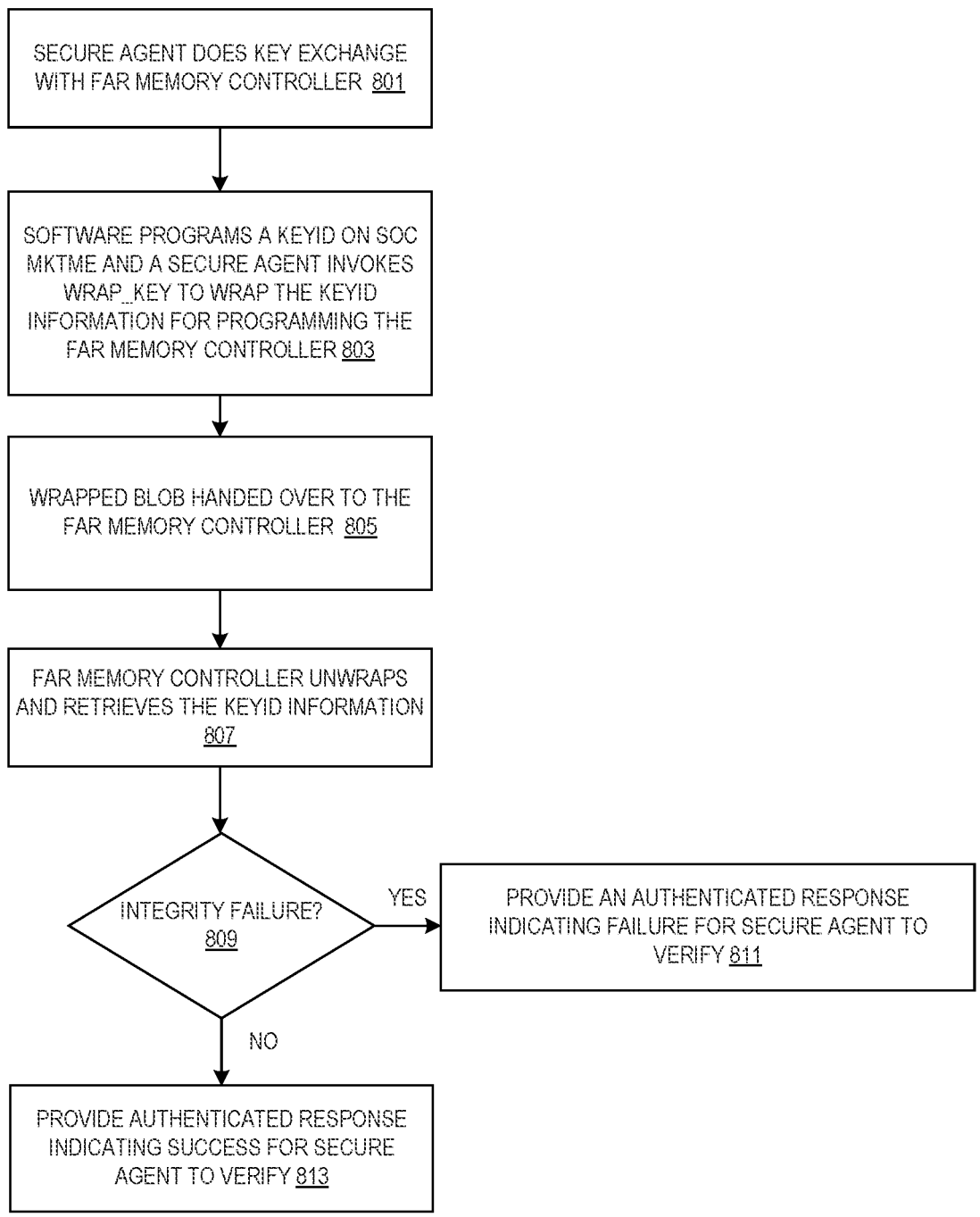
FIG. 8 illustrates embodiments of flow for using the WRAP_KEY instructions.

FIG. 8 illustrates embodiments of flow for using the WRAP_KEY instructions. At 801, an initialization is performed. In particular, a secure agent initiates a key exchange with the far memory controller. This key exchange can be done using standard key exchange protocols such as authenticated Diffie-Hellman (DH) protocol. At the end of the initialization, there is a shared common session key. The session key is stored in a core-accessible location.

At 803 software uses PCONFIG (or other instruction) to program a KeyID on the MKTME engine and a secure agent invokes the WRAP_KEY instruction to wrap the KeyID information for programming the far memory controller. In some embodiments, the 3DXP controller uses MMIO registers to receive the blob and on receiving the blob use the session key to decrypt and integrity verify the blob and upon successful verification, program the KeyID information (including the key associated with the KeyID) to the FZ-MKTME engine.

The wrapped blob is handed over to the far memory controller at 805. The far memory controller unwraps the blob (using the session key) and retrieves the KeyID information at 807.

The far memory controller determines if there is an integrity failure at 809. For example, does the KeyID match an expected value? In the event that the wrapped blob is tampered with by the untrusted software or during transmission over the link, the integrity check during unwrapping at the far memory controller will fail. When there is a failure, the far memory controller generates an authenticated response (a cryptographic response using the session key) indicating failure at 811. When there is a not failure, the far memory controller generates an authenticated response (a cryptographic response using the session key) indicating failure at 813. This response must be verified by the secure agent before allowing the KeyID to be used by secure software.

Detailed below are embodiments of computer architectures, systems, processors, instruction formats, etc. that may be used with embodiments detailed above.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 9:
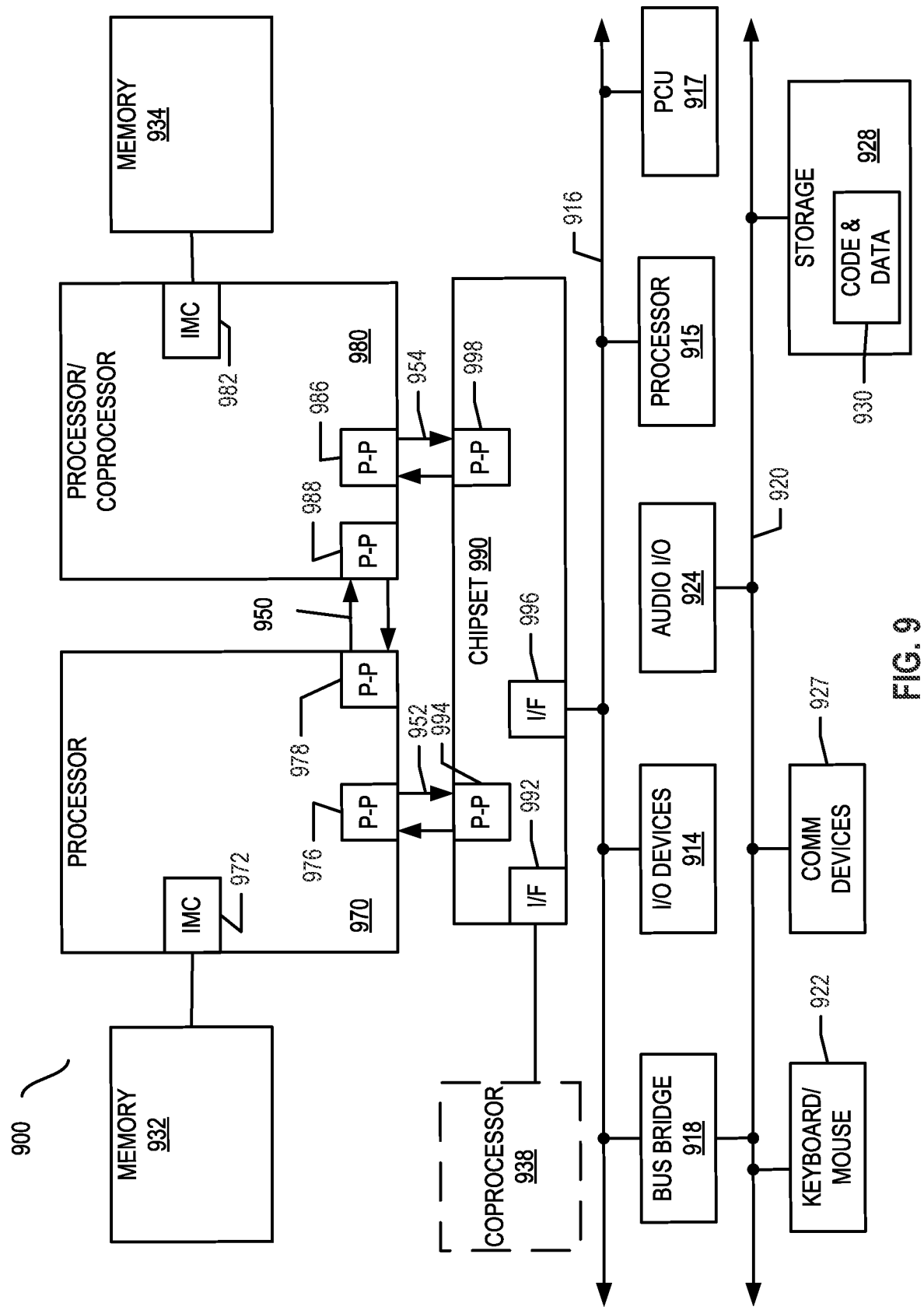
FIG. 9 illustrates embodiments of an exemplary system.

FIG. 9 illustrates embodiments of an exemplary system. Multiprocessor system 900 is a point-to-point interconnect system and includes a plurality of processors including a first processor 970 and a second processor 980 coupled via a point-to-point interconnect 950. In some embodiments, the first processor 970 and the second processor 980 are homogeneous. In some embodiments, first processor 970 and the second processor 980 are heterogenous.

Processors 970 and 980 are shown including integrated memory controller (IMC) units circuitry 972 and 982, respectively. Processor 970 also includes as part of its interconnect controller units point-to-point (P-P) interfaces 976 and 978; similarly, second processor 980 includes P-P interfaces 986 and 988. Processors 970, 980 may exchange information via the point-to-point (P-P) interconnect 950 using P-P interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a chipset 990 via individual P-P interconnects 952, 954 using point to point interface circuits 976, 994, 986, 998. Chipset 990 may optionally exchange information with a coprocessor 938 via a high-performance interface 992. In some embodiments, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor 970, 980 or outside of both processors, yet connected with the processors via P-P interconnect, such that either or both processors' local cache information may be stored in the shared cache if a processor is placed into a low power mode.

Chipset 990 may be coupled to a first interconnect 916 via an interface 996. In some embodiments, first interconnect 916 may be a Peripheral Component Interconnect (PCI) interconnect, or an interconnect such as a PCI Express interconnect or another I/O interconnect. In some embodiments, one of the interconnects couples to a power control unit (PCU) 917, which may include circuitry, software, and/or firmware to perform power management operations with regard to the processors 970, 980 and/or co-processor 938. PCU 917 provides control information to a voltage regulator to cause the voltage regulator to generate the appropriate regulated voltage. PCU 917 also provides control information to control the operating voltage generated. In various embodiments, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other embodiments, power management operations to be performed by PCU 917 may be implemented externally to a processor, such as by way of a separate power management integrated circuit (PMIC) or another component external to the processor. In yet other embodiments, power management operations to be performed by PCU 917 may be implemented within BIOS or other system software.

Various I/O devices 914 may be coupled to first interconnect 916, along with an interconnect (bus) bridge 918 which couples first interconnect 916 to a second interconnect 920. In some embodiments, one or more additional processor(s) 915, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 916. In some embodiments, second interconnect 920 may be a low pin count (LPC) interconnect. Various devices may be coupled to second interconnect 920 including, for example, a keyboard and/or mouse 922, communication devices 927 and a storage unit circuitry 928. Storage unit circuitry 928 may be a disk drive or other mass storage device which may include instructions/code and data 930, in some embodiments. Further, an audio I/O 924 may be coupled to second interconnect 920. Note that other architectures than the point-to-point architecture described above are possible. For example, instead of the point-to-point architecture, a system such as multiprocessor system 900 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 10:
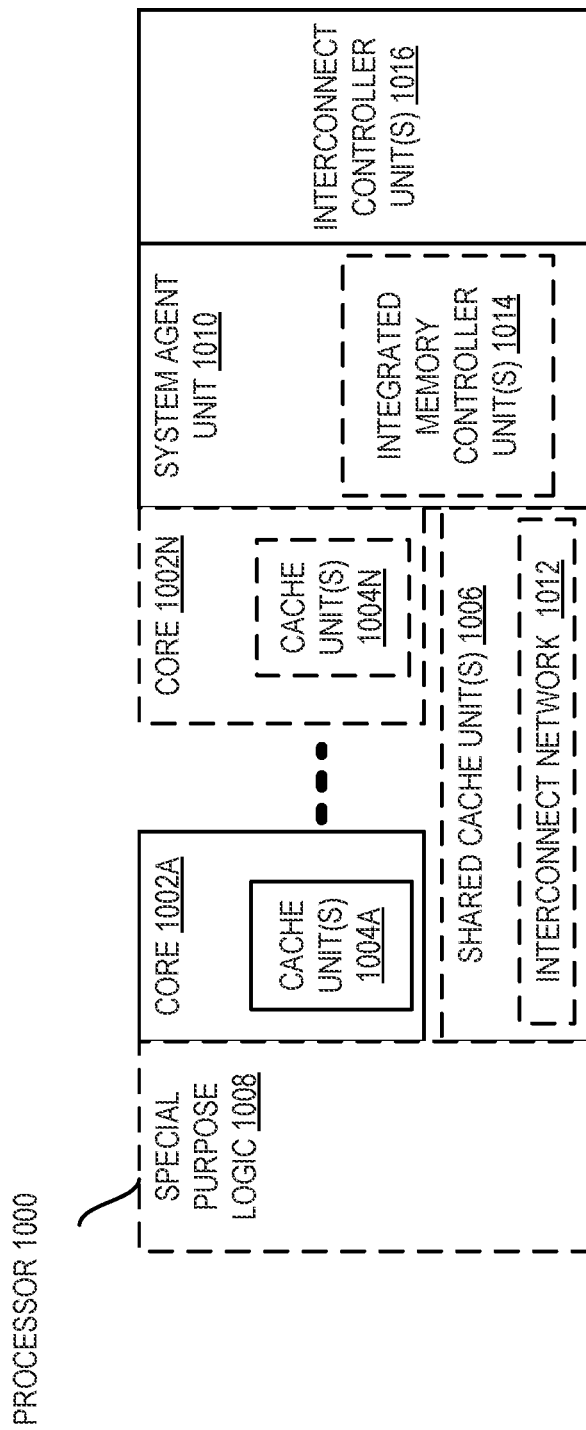
FIG. 10 illustrates a block diagram of embodiments of a processor that may have more than one core, may have an integrated memory controller, and may have integrated graphics.

FIG. 10 illustrates a block diagram of embodiments of a processor 1000 that may have more than one core, may have an integrated memory controller, and may have integrated graphics. The solid lined boxes illustrate a processor 1000 with a single core 1002A, a system agent 1010, a set of one or more interconnect controller units circuitry 1016, while the optional addition of the dashed lined boxes illustrates an alternative processor 1000 with multiple cores 1002(A)-(N), a set of one or more integrated memory controller unit(s) circuitry 1014 in the system agent unit circuitry 1010, and special purpose logic 1008, as well as a set of one or more interconnect controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002(A)-(N) being one or more general purpose cores (e.g., general purpose in-order cores, general purpose out-of-order cores, or a combination of the two); 2) a coprocessor with the cores 1002(A)-(N) being a large number of special purpose cores intended primarily for graphics and/or scientific (throughput); and 3) a coprocessor with the cores 1002(A)-(N) being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

A memory hierarchy includes one or more levels of cache unit(s) circuitry 1004(A)-(N) within the cores 1002(A)-(N), a set of one or more shared cache units circuitry 1006, and external memory (not shown) coupled to the set of integrated memory controller units circuitry 1014. The set of one or more shared cache units circuitry 1006 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 1012 interconnects the special purpose logic 1008 (e.g., integrated graphics logic), the set of shared cache units circuitry 1006, and the system agent unit circuitry 1010, alternative embodiments use any number of well-known techniques for interconnecting such units. In some embodiments, coherency is maintained between one or more of the shared cache units circuitry 1006 and cores 1002(A)-(N).

In some embodiments, one or more of the cores 1002(A)-(N) are capable of multi-threading. The system agent unit circuitry 1010 includes those components coordinating and operating cores 1002(A)-(N). The system agent unit circuitry 1010 may include, for example, power control unit (PCU) circuitry and/or display unit circuitry (not shown). The PCU may be or may include logic and components needed for regulating the power state of the cores 1002(A)-(N) and/or the special purpose logic 1008 (e.g., integrated graphics logic). The display unit circuitry is for driving one or more externally connected displays.

The cores 1002(A)-(N) may be homogenous or heterogeneous in terms of architecture instruction set; that is, two or more of the cores 1002(A)-(N) may be capable of executing the same instruction set, while other cores may be capable of executing only a subset of that instruction set or a different instruction set.

Exemplary Core Architectures
In-Order and Out-of-Order Core Block Diagram

Figure 11A:
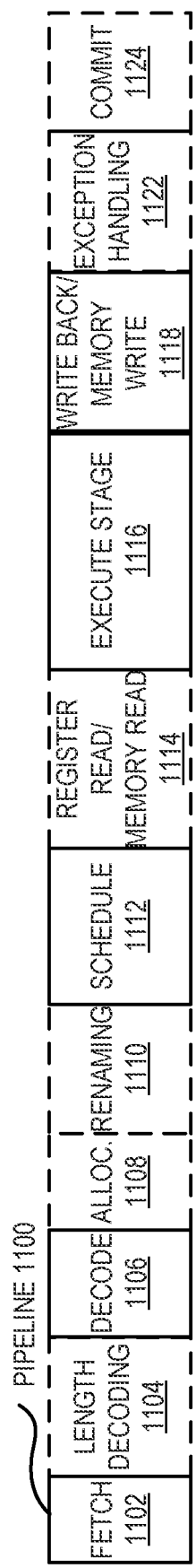
FIG. 11(A) is a block diagram illustrating both an exemplary in-order pipeline and an exemplary register renaming, out-of-order issue/execution pipeline according to embodiments.
Figure 11B:
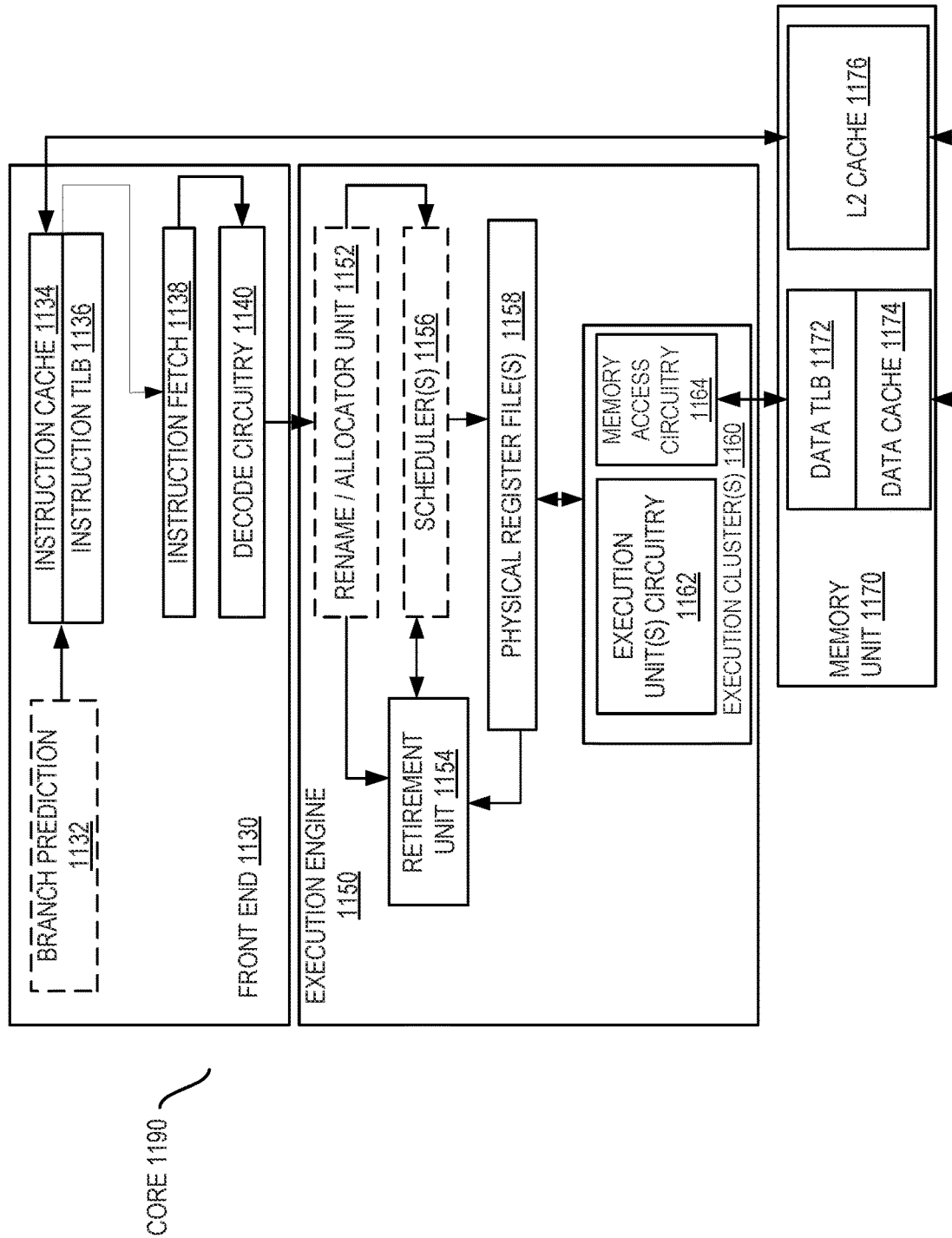
FIG. 11(B) is a block diagram illustrating both an exemplary embodiment of an in-order architecture core and an exemplary register renaming, out-of-order issue/execution architecture core to be included in a processor according to embodiments.

FIG. 11(A) is a block diagram illustrating both an exemplary in-order pipeline and an exemplary register renaming, out-of-order issue/execution pipeline according to embodiments of the invention. FIG. 11(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 11(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11(A), a processor pipeline 1100 includes a fetch stage 1102, an optional length decode stage 1104, a decode stage 1106, an optional allocation stage 1108, an optional renaming stage 1110, a scheduling (also known as a dispatch or issue) stage 1112, an optional register read/memory read stage 1114, an execute stage 1116, a write back/memory write stage 1118, an optional exception handling stage 1122, and an optional commit stage 1124. One or more operations can be performed in each of these processor pipeline stages. For example, during the fetch stage 1102, one or more instructions are fetched from instruction memory, during the decode stage 1106, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 1106 and the register read/memory read stage 1114 may be combined into one pipeline stage. In one embodiment, during the execute stage 1116, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit circuitry 1140 performs the decode stage 1106; 3) the rename/allocator unit circuitry 1152 performs the allocation stage 1108 and renaming stage 1110; 4) the scheduler unit(s) circuitry 1156 performs the schedule stage 1112; 5) the physical register file(s) unit(s) circuitry 1158 and the memory unit circuitry 1170 perform the register read/memory read stage 1114; the execution cluster 1160 perform the execute stage 1116; 6) the memory unit circuitry 1170 and the physical register file(s) unit(s) circuitry 1158 perform the write back/memory write stage 1118; 7) various units (unit circuitry) may be involved in the exception handling stage 1122; and 8) the retirement unit circuitry 1154 and the physical register file(s) unit(s) circuitry 1158 perform the commit stage 1124.

FIG. 11(B) shows processor core 1190 including front-end unit circuitry 1130 coupled to an execution engine unit circuitry 1150, and both are coupled to a memory unit circuitry 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit circuitry 1130 may include branch prediction unit circuitry 1132 coupled to an instruction cache unit circuitry 1134, which is coupled to an instruction translation lookaside buffer (TLB) 1136, which is coupled to instruction fetch unit circuitry 1138, which is coupled to decode unit circuitry 1140. In one embodiment, the instruction cache unit circuitry 1134 is included in the memory unit circuitry 1170 rather than the front-end unit circuitry 1130. The decode unit circuitry 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1140 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM (not shown) or other medium that stores microcode for certain macroinstructions (e.g., in decode unit circuitry 1140 or otherwise within the front end unit circuitry 1130). In one embodiment, the decode unit circuitry 1140 includes a micro-operation (micro-op) or operation cache (not shown) to hold/cache decoded operations, micro-tags, or micro-operations generated during the decode or other stages of the processor pipeline 1100. The decode unit circuitry 1140 may be coupled to rename/allocator unit circuitry 1152 in the execution engine unit circuitry 1150.

The execution engine circuitry 1150 includes the rename/allocator unit circuitry 1152 coupled to a retirement unit circuitry 1154 and a set of one or more scheduler(s) circuitry 1156. The scheduler(s) circuitry 1156 represents any number of different schedulers, including reservations stations, central instruction window, etc. In some embodiments, the scheduler(s) circuitry 1156 can include arithmetic logic unit (ALU) scheduler/scheduling circuitry, ALU queues, arithmetic generation unit (AGU) scheduler/scheduling circuitry, AGU queues, etc. The scheduler(s) circuitry 1156 is coupled to the physical register file(s) circuitry 1158. Each of the physical register file(s) circuitry 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 1158 includes vector registers unit circuitry, writemask registers unit circuitry, and scalar register unit circuitry. These register units may provide architectural vector registers, vector mask registers, general-purpose registers, etc. The physical register file(s) unit(s) circuitry 1158 is overlapped by the retirement unit circuitry 1154 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers;

etc.). The retirement unit circuitry 1154 and the physical register file(s) circuitry 1158 are coupled to the execution cluster(s) 1160. The execution cluster(s) 1160 includes a set of one or more execution units circuitry 1162 and a set of one or more memory access circuitry 1164. The execution units circuitry 1162 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1156, physical register file(s) unit(s) circuitry 1158, and execution cluster(s) 1160 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1164). It should also be understood that where separate pipelines are used, one or more of these pipelines may be out-of-order issue/execution and the rest in-order.

In some embodiments, the execution engine unit circuitry 1150 may perform load store unit (LSU) address/data pipelining to an Advanced Microcontroller Bus (AHB) interface (not shown), and address phase and writeback, data phase load, store, and branches.

The set of memory access circuitry 1164 is coupled to the memory unit circuitry 1170, which includes data TLB unit circuitry 1172 coupled to a data cache circuitry 1174 coupled to a level 2 (L2) cache circuitry 1176. In one exemplary embodiment, the memory access units circuitry 1164 may include a load unit circuitry, a store address unit circuit, and a store data unit circuitry, each of which is coupled to the data TLB circuitry 1172 in the memory unit circuitry 1170. The instruction cache circuitry 1134 is further coupled to a level 2 (L2) cache unit circuitry 1176 in the memory unit circuitry 1170. In one embodiment, the instruction cache 1134 and the data cache 1174 are combined into a single instruction and data cache (not shown) in L2 cache unit circuitry 1176, a level 3 (L3) cache unit circuitry (not shown), and/or main memory. The L2 cache unit circuitry 1176 is coupled to one or more other levels of cache and eventually to a main memory.

The core 1190 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1190 includes logic to support a packed data instruction set extension (e.g., AVX1, AVX2), thereby allowing the operations used by many multimedia applications to be performed using packed data.

Exemplary Execution Unit(s) Circuitry

Figure 12:
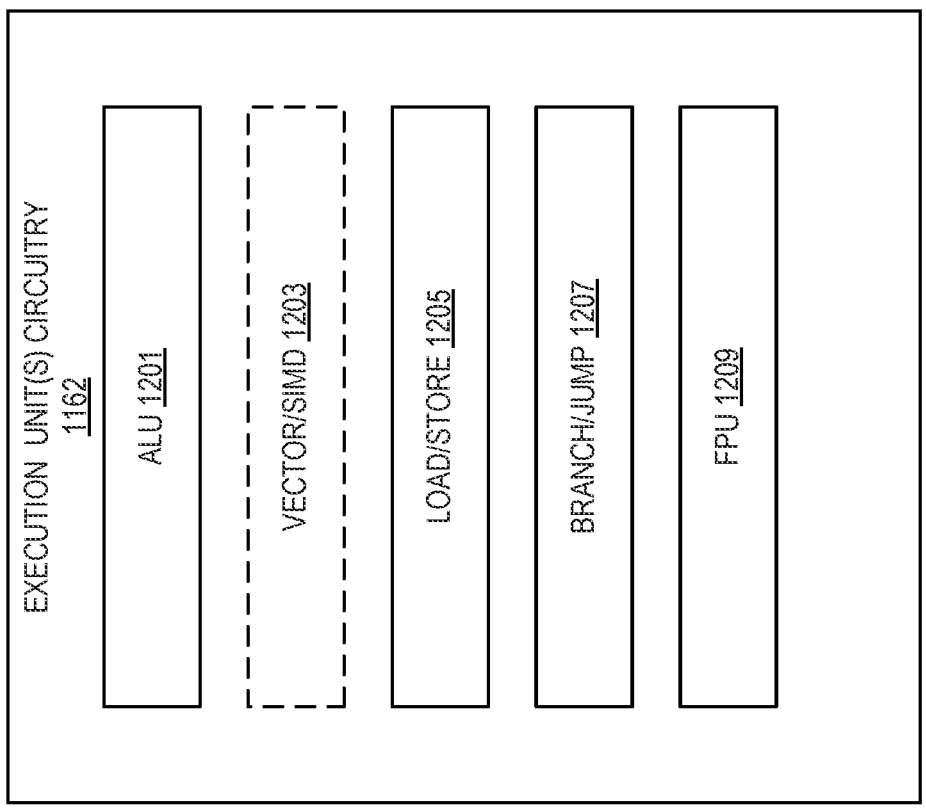
FIG. 12 illustrates embodiments of execution unit(s) circuitry.

FIG. 12 illustrates embodiments of execution unit(s) circuitry, such as execution unit(s) circuitry 1162 of FIG. 11(B). As illustrated, execution unit(s) circuitry 1162 may include one or more ALU circuits 1201, vector/SIMD unit circuits 1203, load/store unit circuits 1205, and/or branch/jump unit circuits 1207. ALU circuits 1201 perform integer arithmetic and/or Boolean operations. Vector/SIMD unit circuits 1203 perform vector/SIMD operations on packed data (such as SIMD/vector registers). Load/store unit circuits 1205 execute load and store instructions to load data from memory into registers or store from registers to memory. Load/store unit circuits 1205 may also generate addresses. Branch/jump unit circuits 1207 cause a branch or jump to a memory address depending on the instruction. Floating-point unit (FPU) circuits 1209 perform floating-point arithmetic. The width of the execution unit(s) circuitry 1162 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 13:
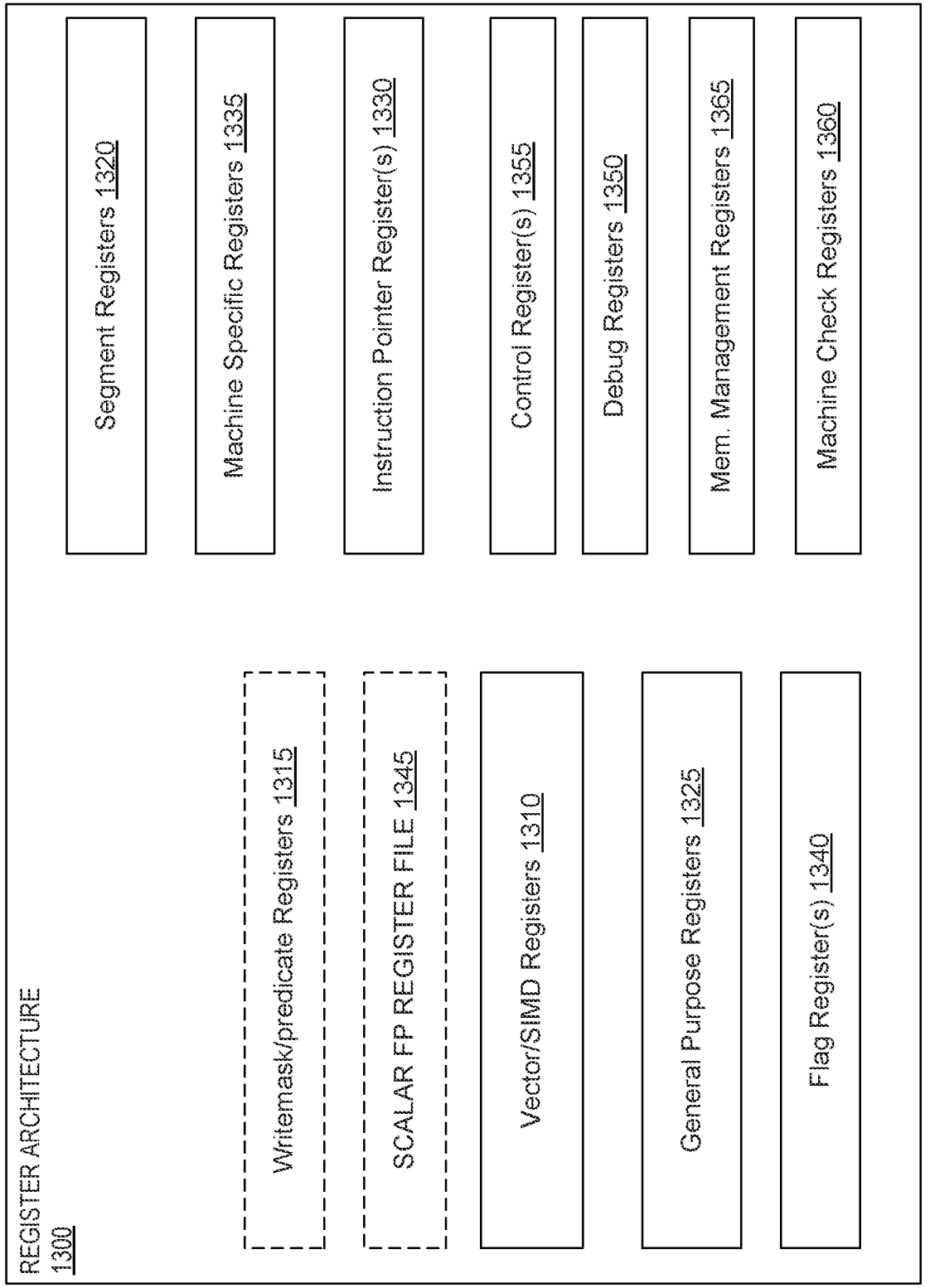
FIG. 13 is a block diagram of a register architecture according to some embodiments.

FIG. 13 is a block diagram of a register architecture 1300 according to some embodiments. As illustrated, there are vector/SIMD registers 1310 that vary from 128-bit to 1,024 bits width. In some embodiments, the vector/SIMD registers 1310 are physically 512-bits and, depending upon the mapping, only some of the lower bits are used. For example, in some embodiments, the vector/SIMD registers 1310 are ZMM registers which are 512 bits: the lower 256 bits used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1300 includes writemask/predicate registers 1315. For example, in some embodiments, there are 8 writemask/predicate registers (sometimes called k0 through k7) that are each 16-bit, 32-bit, 64-bit, or 128-bit in size. Writemask/predicate registers 1315 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1315 corresponds to a data element position of the destination. In other embodiments, the writemask/predicate registers 1315 are scalable and consists of a set number of enable bits for a given vector element (e.g., 8 enable bits per 64-bit vector element).

The register architecture 1300 includes a plurality of general-purpose registers 1325. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1300 includes scalar floating-point register 1345 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1340 (e.g., EFLAGS, RFLAGS, etc.) store status and control information for arithmetic, compare, and system operations. For example, the one or more flag registers 1340 may store condition code information such as carry, parity, auxiliary carry, zero, sign, and overflow. In some embodiments, the one or more flag registers 1340 are called program status and control registers.

Segment registers 1320 contain segment points for use in accessing memory. In some embodiments, these registers are referenced by the names CS, DS, SS, ES, FS, and GS.

Machine specific registers (MSRs) 1335 control and report on processor performance. Most MSRs 1335 handle system-related functions and are not accessible to an application program. Machine check registers 1360 consist of control, status, and error reporting MSRs that are used to detect and report on hardware errors.

One or more instruction pointer register(s) 1330 store an instruction pointer value. Control register(s) 1355 (e.g., CR0-CR4) determine the operating mode of a processor (e.g., processor 970, 980, 938, 915, and/or 1000) and the characteristics of a currently executing task. Debug registers 1350 control and allow for the monitoring of a processor or core's debugging operations.

Memory management registers 1365 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 14:
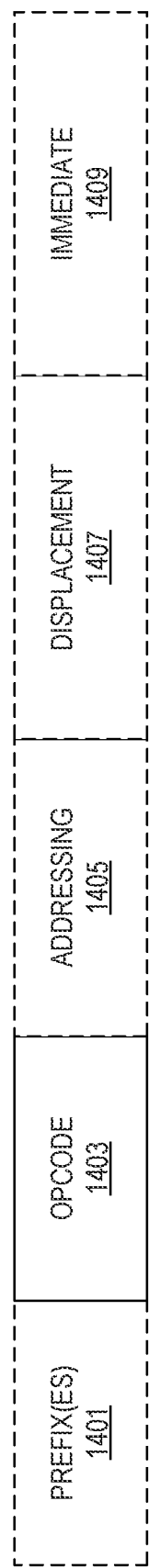
FIG. 14 illustrates embodiments of an instruction format.

FIG. 14 illustrates embodiments of an instruction format. As illustrated, an instruction may include multiple components including, but not limited to, one or more fields for: one or more prefixes 1401, an opcode 1403, addressing information 1405 (e.g., register identifiers, memory addressing information, etc.), a displacement value 1407, and/or an immediate 1409. Note that some instructions utilize some or all of the fields of the format whereas others may only use the field for the opcode 1403. In some embodiments, the order illustrated is the order in which these fields are to be encoded, however, it should be appreciated that in other embodiments these fields may be encoded in a different order, combined, etc.

The prefix(es) field(s) 1401, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1403 is used to at least partially define the operation to be performed upon a decoding of the instruction. In some embodiments, a primary opcode encoded in the opcode field 1403 is 1, 2, or 3 bytes in length. In other embodiments, a primary opcode can be a different length. An additional 3-bit opcode field is sometimes encoded in another field.

Figure 15:
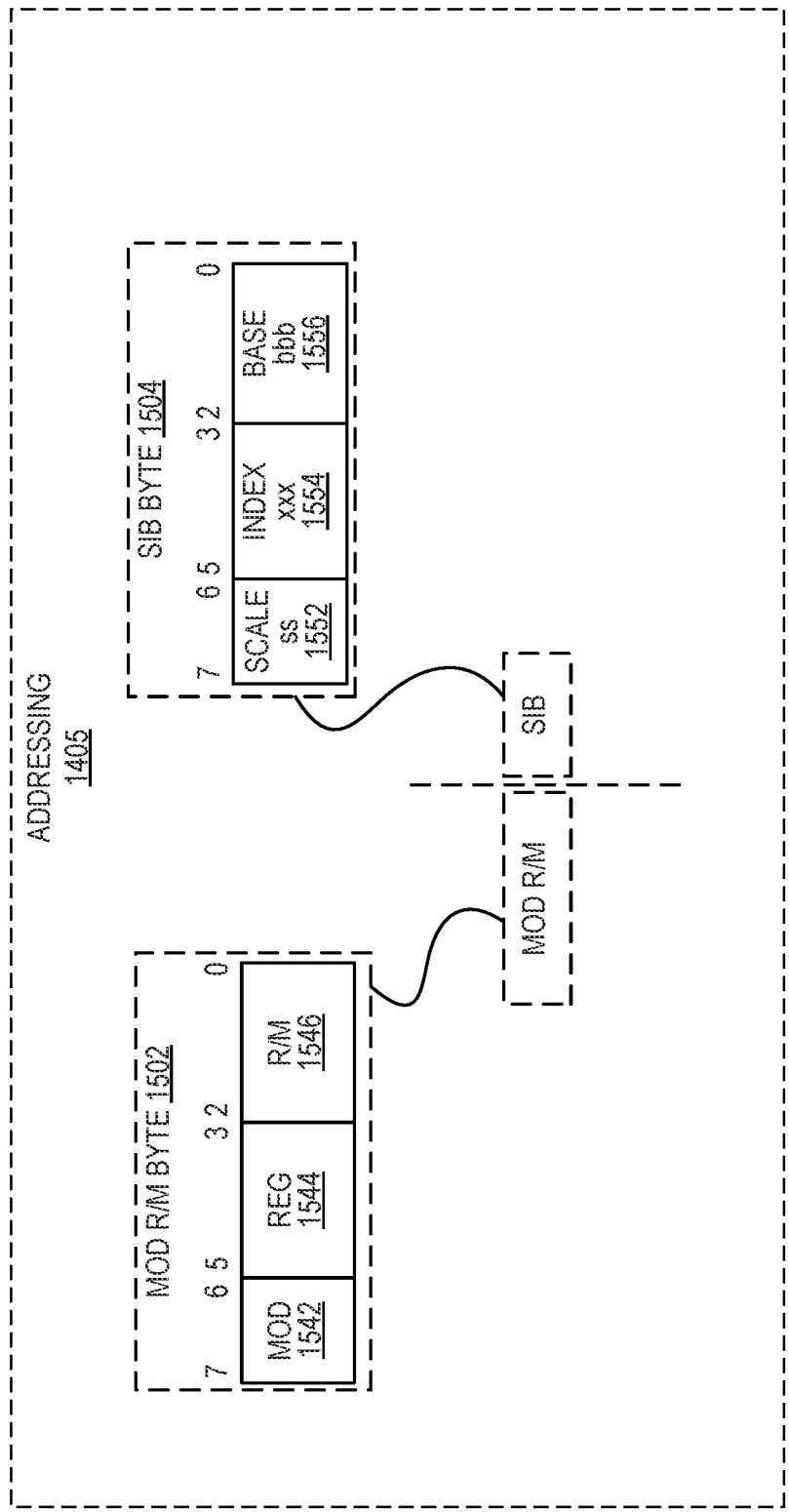
FIG. 15 illustrates embodiments of the addressing field.

The addressing field 1405 is used to address one or more operands of the instruction, such as a location in memory or one or more registers. FIG. 15 illustrates embodiments of the addressing field 1405. In this illustration, an optional ModR/M byte 1502 and an optional Scale, Index, Base (SIB) byte 1504 are shown. The ModR/M byte 1502 and the SIB byte 1504 are used to encode up to two operands of an instruction, each of which is a direct register or effective memory address. Note that each of these fields are optional in that not all instructions include one or more of these fields. The MOD R/M byte 1502 includes a MOD field 1542, a register field 1544, and R/M field 1546.

The content of the MOD field 1542 distinguishes between memory access and non-memory access modes. In some embodiments, when the MOD field 1542 has a value of b11, a register-direct addressing mode is utilized, and otherwise register-indirect addressing is used.

The register field 1544 may encode either the destination register operand or a source register operand, or may encode an opcode extension and not be used to encode any instruction operand. The content of register index field 1544, directly or through address generation, specifies the locations of a source or destination operand (either in a register or in memory). In some embodiments, the register field 1544 is supplemented with an additional bit from a prefix (e.g., prefix 1401) to allow for greater addressing.

The R/M field 1546 may be used to encode an instruction operand that references a memory address, or may be used to encode either the destination register operand or a source register operand. Note the R/M field 1546 may be combined with the MOD field 1542 to dictate an addressing mode in some embodiments.

The SIB byte 1504 includes a scale field 1552, an index field 1554, and a base field 1556 to be used in the generation of an address. The scale field 1552 indicates scaling factor. The index field 1554 specifies an index register to use. In some embodiments, the index field 1554 is supplemented with an additional bit from a prefix (e.g., prefix 1401) to allow for greater addressing. The base field 1556 specifies a base register to use. In some embodiments, the base field 1556 is supplemented with an additional bit from a prefix (e.g., prefix 1401) to allow for greater addressing. In practice, the content of the scale field 1552 allows for the scaling of the content of the index field 1554 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1407 provides this value. Additionally, in some embodiments, a displacement factor usage is encoded in the MOD field of the addressing field 1405 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1407.

In some embodiments, an immediate field 1409 specifies an immediate for the instruction. An immediate may be encoded as a 1-byte value, a 2-byte value, a 4-byte value, etc.

FIG. 16 illustrates embodiments of a first prefix 1401(A). In some embodiments, the first prefix 1401(A) is an embodiment of a REX prefix. Instructions that use this prefix may specify general purpose registers, 64-bit packed data registers (e.g., single instruction, multiple data (SIM D) registers or vector registers), and/or control registers and debug registers (e.g., CR8-CR15 and DR8-DR15).

Instructions using the first prefix 1401(A) may specify up to three registers using 3-bit fields depending on the format: 1) using the reg field 1544 and the R/M field 1546 of the Mod R/M byte 1502; 2) using the Mod R/M byte 1502 with the SIB byte 1504 including using the reg field 1544 and the base field 1556 and index field 1554; or 3) using the register field of an opcode.

In the first prefix 1401(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1544 and MOD R/M R/M field 1546 alone can each only address 8 registers.

In the first prefix 1401(A), bit position 2 (R) may an extension of the MOD R/M reg field 1544 and may be used to modify the ModR/M reg field 1544 when that field encodes a general purpose register, a 64-bit packed data register (e.g., a SSE register), or a control or debug register. R is ignored when Mod R/M byte 1502 specifies other registers or defines an extended opcode.

Bit position 1 (X) X bit may modify the SIB byte index field 1554.

Bit position B (B) B may modify the base in the Mod R/M R/M field 1546 or the SIB byte base field 1556; or it may modify the opcode register field used for accessing general purpose registers (e.g., general purpose registers 1325).

FIGS. 17(A)-(D) illustrate embodiments of how the R, X, and B fields of the first prefix 1401(A) are used. FIG. 17(A) illustrates R and B from the first prefix 1401(A) being used to extend the reg field 1544 and R/M field 1546 of the MOD R/M byte 1502 when the SIB byte 1504 is not used for memory addressing. FIG. 17(B) illustrates R and B from the first prefix 1401(A) being used to extend the reg field 1544 and R/M field 1546 of the MOD R/M byte 1502 when the SIB byte 1504 is not used (register-register addressing). FIG. 17(C) illustrates R, X, and B from the first prefix 1401(A) being used to extend the reg field 1544 of the MOD R/M byte 1502 and the index field 1554 and base field 1556 when the SIB byte 1504 being used for memory addressing. FIG. 17(D) illustrates B from the first prefix 1401(A) being used to extend the reg field 1544 of the MOD R/M byte 1502 when a register is encoded in the opcode 1403.

Figure 18A:
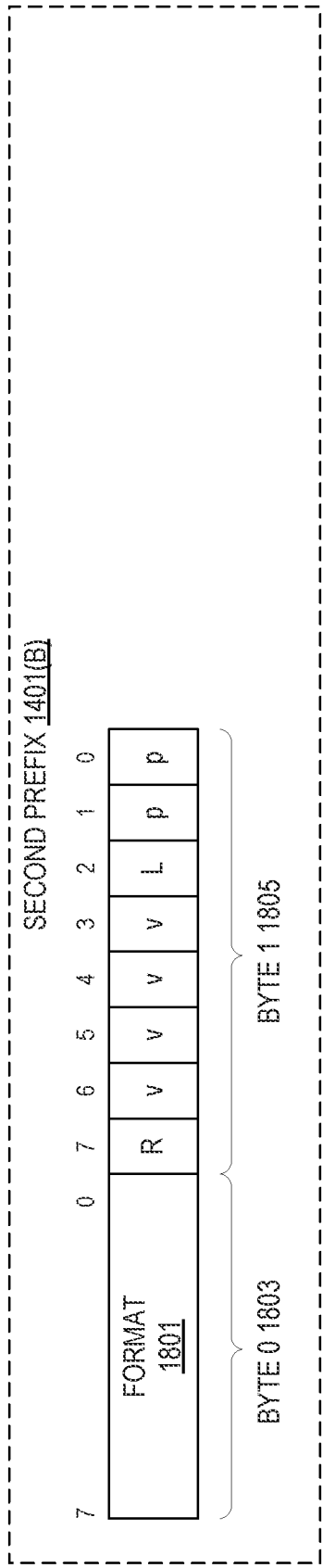
FIGS. 18(A)-(B) illustrate embodiments of a second prefix.
Figure 18B:
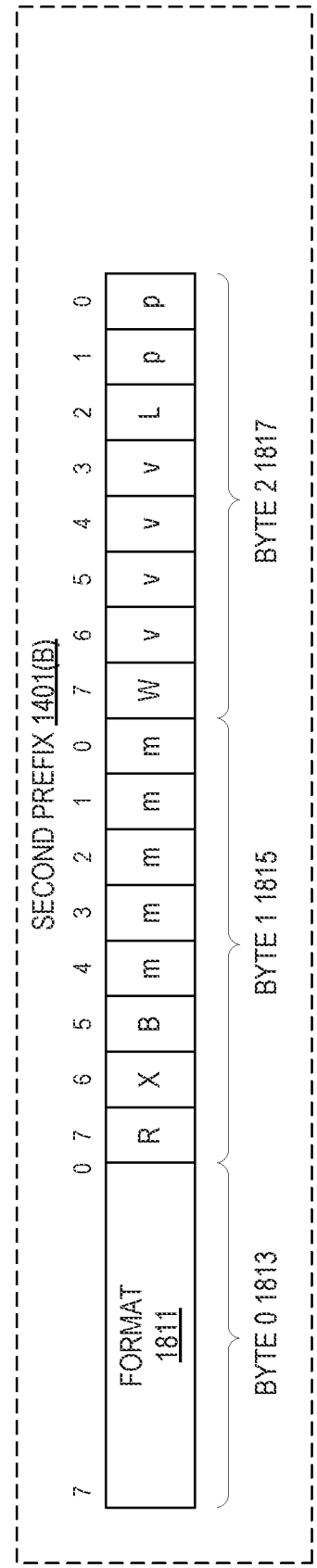

FIGS. 18(A)-(B) illustrate embodiments of a second prefix 1401(B). In some embodiments, the second prefix 1401(B) is an embodiment of a VEX prefix. The second prefix 1401(B) encoding allows instructions to have more than two operands, and allows SIMD vector registers (e.g., vector/SIMD registers 1310) to be longer than 64-bits (e.g., 128-bit and 256-bit). The use of the second prefix 1401(B) provides for three-operand (or more) syntax. For example, previous two-operand instructions performed operations such as A=A+B, which overwrites a source operand. The use of the second prefix 1401(B) enables operands to perform nondestructive operations such as A=B+C.

In some embodiments, the second prefix 1401(B) comes in two forms—a two-byte form and a three-byte form. The two-byte second prefix 1401(B) is used mainly for 128-bit, scalar, and some 256-bit instructions; while the three-byte second prefix 1401(B) provides a compact replacement of the first prefix 1401(A) and 3-byte opcode instructions.

FIG. 18(A) illustrates embodiments of a two-byte form of the second prefix 1401(B). In one example, a format field 1801 (byte 0 1803) contains the value CSH. In one example, byte 1 1805 includes a "R" value in bit[7]. This value is the complement of the same value of the first prefix 1401(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1546 to encode the instruction operand that references a memory address or encode either the destination register operand or a source register operand.

Instructions that use this prefix may use the Mod R/M reg field 1544 to encode either the destination register operand or a source register operand, be treated as an opcode extension and not used to encode any instruction operand.

For instruction syntax that support four operands, vvvv, the Mod R/M R/M field 1546 and the Mod R/M reg field 1544 encode three of the four operands. Bits[7:4] of the immediate 1409 are then used to encode the third source register operand.

FIG. 18(B) illustrates embodiments of a three-byte form of the second prefix 1401(B). in one example, a format field 1811 (byte 0 1813) contains the value C4H. Byte 1 1815 includes in bits[7:5] "R," "X," and "B" which are the complements of the same values of the first prefix 1401(A). Bits[4:0] of byte 1 1815 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1817 is used similar to W of the first prefix 1401(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1546 to encode the instruction operand that references a memory address or encode either the destination register operand or a source register operand.

Instructions that use this prefix may use the Mod R/M reg field 1544 to encode either the destination register operand or a source register operand, be treated as an opcode extension and not used to encode any instruction operand.

For instruction syntax that support four operands, vvvv, the Mod R/M R/M field 1546, and the Mod R/M reg field 1544 encode three of the four operands. Bits[7:4] of the immediate 1409 are then used to encode the third source register operand.

Figure 19:
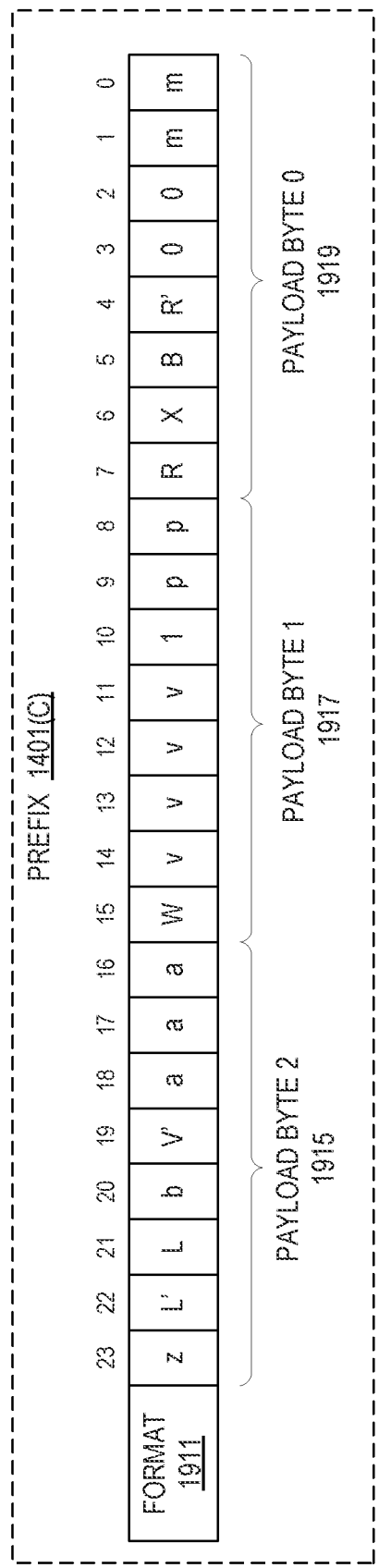
FIG. 19 illustrates embodiments of a third prefix.

FIG. 19 illustrates embodiments of a third prefix 1401(C). In some embodiments, the first prefix 1401(A) is an embodiment of an EVEX prefix. The third prefix 1401(C) is a four-byte prefix.

The third prefix 1401(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 13) or predication utilize this prefix. Opmask register allow for conditional processing or selection control. Opmask instructions, whose source/destination operands are opmask registers and treat the content of an opmask register as a single value, are encoded using the second prefix 1401(B).

The third prefix 1401(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1401(C) is a format field 1911 that has a value, in one example, of 62H. Subsequent bytes are referred to as payload bytes 1915-1919 and collectively form a 24-bit value of P[23:0] providing specific capability in the form of one or more fields (detailed herein).

In some embodiments, P[1:0] of payload byte 1919 are identical to the low two mmmmm bits. P[3:2] are reserved in some embodiments. Bit P[4] (R') allows access to the high 16 vector register set when combined with P[7] and the ModR/M reg field 1544. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1544 and ModR/M R/M field 1546. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1401(A) and second prefix 1411(B) and may serve as an opcode extension bit or operand size promotion.

P[18:16] specify the index of a register in the opmask (writemask) registers (e.g., writemask/predicate registers 1315). In one embodiment of the invention, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1401(C) are detailed in the following tables.

TABLE 1

32-Register Support in 64-bit Mode

| | 4 | 3 | [2:0] | REG.TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |

TABLE 1-continued

32-Register Support in 64-bit Mode

|       | 4  | 3 | [2:0]     | REG.TYPE    | COMMON USAGES         |
|-------|----|---|-----------|-------------|-----------------------|
| BASE  | 0  | B | ModR/M R/M| GPR         | Memory addressing     |
| INDEX | 0  | X | SIB.index | GPR         | Memory addressing     |
| VIDX  | V' | X | SIB.index | Vector      | VSIB memory addressing|

TABLE 2

Encoding Register Specifiers in 32-bit Mode

|       | [2:0]       | REG.TYPE    | COMMON USAGES          |
|-------|-------------|-------------|------------------------|
| REG   | ModR/M reg  | GPR, Vector | Destination or Source  |
| VVVV  | vvvv        | GPR, Vector | $2^{nd}$ Source or Destination |
| RM    | ModR/M R/M  | GPR, Vector | $1^{st}$ Source or Destination |
| BASE  | ModR/M R/M  | GPR         | Memory addressing      |
| INDEX | SIB.index   | GPR         | Memory addressing      |
| VIDX  | SIB.index   | Vector      | VSIB memory addressing |

TABLE 3

Opmask Register Specifier Encoding

|       | [2:0]      | REG.TYPE | COMMON USAGES  |
|-------|------------|----------|----------------|
| REG   | ModR/M Reg | k0-k7    | Source         |
| VVVV  | vvvv       | k0-k7    | $2^{nd}$ Source|
| RM    | ModR/M R/M | k0-7     | $1^{st}$ Source|
| {k1}  | aaa        | k0$^1$-k7| Opmask         |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
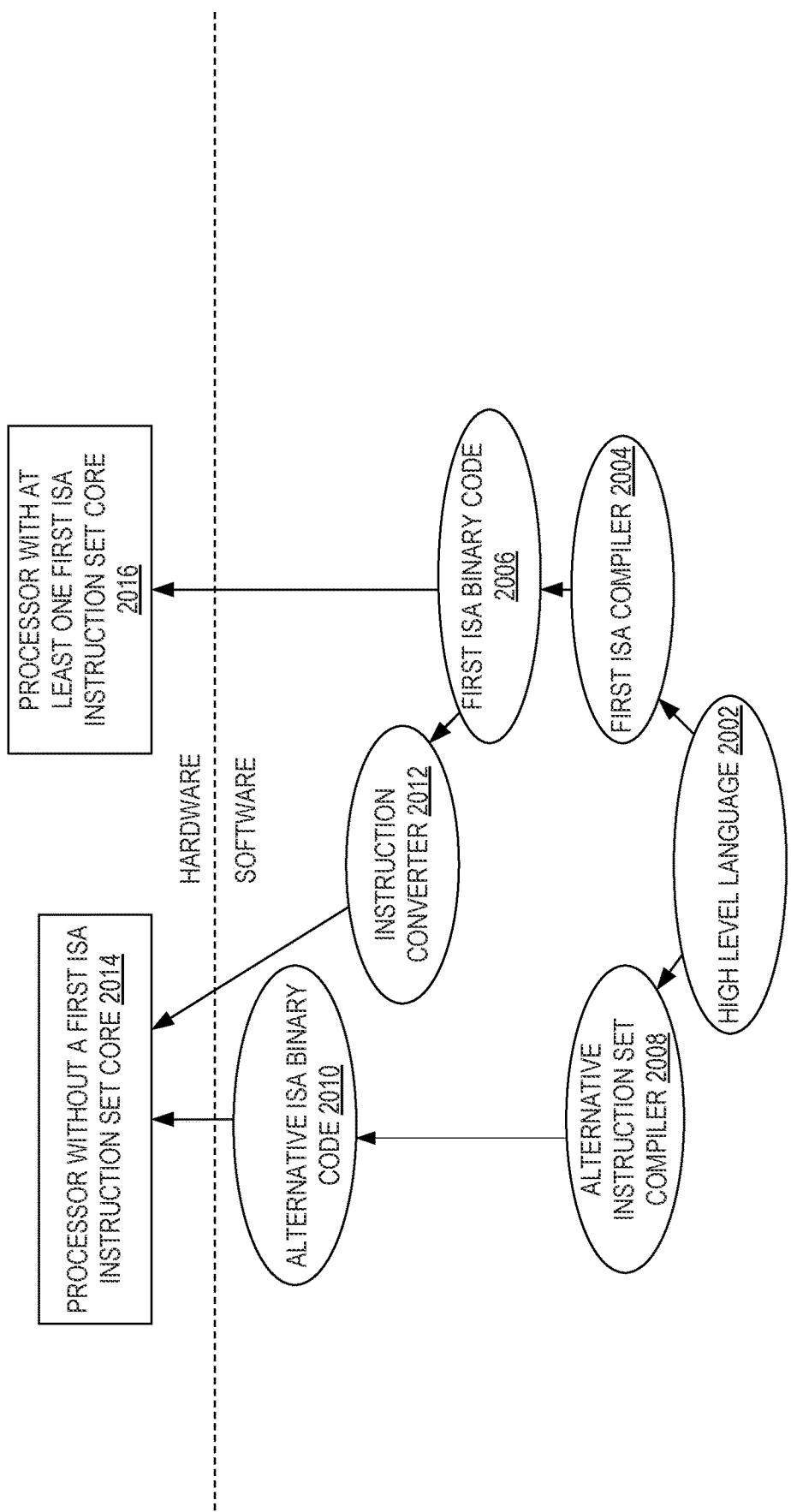
FIG. 20 illustrates a block diagram contrasting the use of a software instruction converter to convert binary instructions in a source instruction set to binary instructions in a target instruction set according to embodiments.

FIG. 20 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using a first ISA compiler 2004 to generate first ISA binary code 2006 that may be natively executed by a processor with at least one first instruction set core 2016. The processor with at least one first ISA instruction set core 2016 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2004 represents a compiler that is operable to generate first ISA binary code 2006 (e.g., object code) that can, with or without additional linkage processing, be executed on the processor with at least one first ISA instruction set core 2016. Similarly, FIG. 20 shows the program in the high level language 2002 may be compiled using an alternative instruction set compiler 2008 to generate alternative instruction set binary code 2010 that may be natively executed by a processor without a first ISA instruction set core 2014. The instruction converter 2012 is used to convert the first ISA binary code 2006 into code that may be natively executed by the processor without a first ISA instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have a first ISA instruction set processor or core to execute the first ISA binary code 2006.

Exemplary embodiments include, but are not limited to:
1. An apparatus comprising:
   far memory to be utilized as volatile memory;
   a far memory controller to receive a request from near memory for a processor, the far memory controller to:
      determine a type of request for the received request, and
      for a read request to at least determine if a fast zero memory indication is set, and
         when set, is to send read data from far memory to a destination along with a message authentication code (MAC), and
         when not set, is to encrypt the read data, generate a MAC, and send the read data and generated MAC to a destination.
2. The apparatus of example 1, wherein the far memory controller includes a key data structure to store an encryption key used to encrypt the read data.
3. The apparatus of example 1, further comprising:
   fast zero memory logic to zero data in the far memory.
4. The apparatus of example 1, wherein the far memory is non-volatile memory acting as volatile memory.
5. The apparatus of example 1, wherein the far memory controller is to generate a tweak to use in the encryption of the read data.
6. The apparatus of example 5, wherein the tweak is generated based on a key identifier of the request.
7. The apparatus of example 6, wherein the key identifier of the request to be buffered in the far memory controller.
8. The apparatus of example 1, wherein the far memory controller is to, for a write request, send data of the write request to far memory without performing encryption or MAC generation.
9. The apparatus of example 1, further comprising:
   a processor; and
   near memory proximate to the processor and between the processor and the far memory.
10. The apparatus of example 9, wherein the processor and near memory are a part of a system on a chip.
11. The apparatus of example 9, wherein the near memory is random access memory.
12. The apparatus of example 1, wherein the far memory is 3D cross point memory.
13. An apparatus comprising:
   a processor core;
   far memory to be utilized as volatile memory for the processor core;
   a far memory controller to receive a request from near memory for the processor core, the far memory controller to:
      determine a type of request for the received request, and
      for a read request to at least determine if a fast zero memory indication is set, and
         when set, is to send read data from far memory to a destination along with a message authentication code (MAC), and
         when not set, is to encrypt the read data, generate a MAC, and send the encrypted read data and generated MAC to a destination.
14. The apparatus of example 13, wherein the far memory controller includes a key data structure to store an encryption key used to encrypt the read data.
15. The apparatus of example 13, further comprising:
   fast zero memory logic to zero data in the far memory.
16. The apparatus of example 13, wherein the far memory is non-volatile memory acting as volatile memory.
17. The apparatus of example 13, wherein the far memory controller is to generate a tweak to use in the encryption of the read data.
18. The apparatus of example 17, wherein the tweak is generated based on a key identifier of the request.
19. The apparatus of example 18, wherein the key identifier of the request to be buffered in the far memory controller.
20. The apparatus of example 13, wherein the far memory controller is to, for a write request, send data of the write request to far memory without performing encryption or MAC generation.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:
1. An apparatus comprising:
   a far memory to be utilized as volatile memory; and
   a far memory controller to receive a request from a near memory for a processor, the far memory controller to:
      determine a type of request for the received request, and
      for a read request to at least determine if a fast zero memory indication is set, and
         when not set, is to send read data from far memory to a destination along with a message authentication code (MAC), and
         when set, is to encrypt the read data, generate a MAC, and send the encrypted read data and generated MAC to a destination, wherein the fast zero memory indication is to indicate when a read is a first read for a location from the far memory.

2. The apparatus of claim 1, wherein the far memory controller includes a key data structure to store an encryption key used to encrypt the read data.

3. The apparatus of claim 1, further comprising:
fast zero memory logic to zero data in the far memory.

4. The apparatus of claim 1, wherein the far memory is non-volatile memory acting as volatile memory.

5. The apparatus of claim 1, wherein the far memory controller is to generate a tweak to use in the encryption of the read data.

6. The apparatus of claim 5, wherein the tweak is generated based on a key identifier of the request.

7. The apparatus of claim 6, wherein the key identifier of the request to be buffered in the far memory controller.

8. The apparatus of claim 1, wherein the far memory controller is to, for a write request, send data of the write request to far memory without performing encryption or MAC generation.

9. The apparatus of claim 1, further comprising:
a processor; and
the near memory proximate to the processor and between the processor and the far memory.

10. The apparatus of claim 9, wherein the processor and the near memory are a part of a system on a chip.

11. The apparatus of claim 9, wherein the near memory is a random access memory.

12. The apparatus of claim 1, wherein the far memory is a 3D cross point memory.

13. An apparatus comprising:
a processor core;
a far memory to be utilized as volatile memory for the processor core; and
a far memory controller to receive a request from a near memory for the processor core, the far memory controller to:
determine a type of request for the received request, and
for a read request to at least determine if a fast zero memory indication is set, and
when not set, is to send read data from far memory to a destination along with a message authentication code (MAC), and
when set, is to encrypt the read data, generate a MAC, and send the encrypted read data and generated MAC to a destination, wherein the fast zero memory indication is to indicate when a read is a first read for a location from the far memory.

14. The apparatus of claim 13, wherein the far memory controller includes a key data structure to store an encryption key used to encrypt the read data.

15. The apparatus of claim 13, further comprising:
fast zero memory logic to zero data in the far memory.

16. The apparatus of claim 13, wherein the far memory is non-volatile memory acting as volatile memory.

17. The apparatus of claim 13, wherein the far memory controller is to generate a tweak to use in the encryption of the read data.

18. The apparatus of claim 17, wherein the tweak is generated based on a key identifier of the request.

19. The apparatus of claim 18, wherein the key identifier of the request to be buffered in the far memory controller.

20. The apparatus of claim 13, wherein the far memory controller is to, for a write request, send data of the write request to far memory without performing encryption or MAC generation.

* * * * *